(12) United States Patent
Narita et al.

(10) Patent No.: US 6,777,656 B2
(45) Date of Patent: Aug. 17, 2004

(54) NEAR-FIELD SPECTROMETER HAVING BACKGROUND SPECTRAL INFORMATION

(75) Inventors: Yoshihito Narita, Hachioji (JP); Fuminori Sato, Hachioji (JP); Tohru Sakamaki, Hachioji (JP); Tsutomu Inoue, Hachioji (JP); Shigeyuki Kimura, Hachioji (JP); Norihito Hujiwara, Hachioji (JP)

(73) Assignee: Jasco Corporation, Tokyo (JP)

( * ) Notice: Subject to any disclaimer, the term of this patent is extended or adjusted under 35 U.S.C. 154(b) by 190 days.

(21) Appl. No.: 10/238,627

(22) Filed: Sep. 11, 2002

(65) Prior Publication Data

US 2003/0062463 A1 Apr. 3, 2003

(30) Foreign Application Priority Data

Sep. 28, 2001 (JP) ....................................... 2001-301989
Sep. 28, 2001 (JP) ....................................... 2001-304031
Dec. 13, 2001 (JP) ....................................... 2001-379711

(51) Int. Cl.$^7$ ................................................ G02B 7/04
(52) U.S. Cl. .................................... 250/201.3; 250/306
(58) Field of Search ............................. 250/201.3, 216, 250/306, 307, 310; 356/450, 491

(56) References Cited

U.S. PATENT DOCUMENTS 6,710,331 B2    3/2004  Narita et al. ................. 250/234

OTHER PUBLICATIONS

Dragnea, Bogdan et al., "Advances in submicron infrared vibrational band chemical imaging," Int. Reviews in Physical Chemistry, 2001, vol. 20, No. 1, pp. 59–92.

Aigouy, L. et al., "Near–field optical spectroscopy using an incoherent light source," Applied Physics Letters, vol. 76, No. 4, Jan. 24, 2000, pp. 397–399.

Knoll, B. et al., "Near–field probing of vibrational absorption for chemical microscopy," NATURE, vol. 399, May 13, 1999, pp. 134–137.

Simanovskii, D. et al., "Near–field infrared microscopy with a transient photoinduced aperture," Applied Physics Letters, vol. 79, No. 8, Aug. 20, 2001, pp. 1214–1216.

Webster, S. et al., "Sub–micron spatial resolution Raman spectroscopy and its application to stress mapping in silicon," Spectroscopy Europe, Oct. 4, (1988), pp. 22–27.

Hsu, J. W. P. et al., "A shear force feedback control system for near–field scanning optical microscopes without lock–in detection," Rev. Sci. Instrum., 68 (8), Aug. 1997, pp. 3093–3095.

*Primary Examiner*—Que T. Le
(74) *Attorney, Agent, or Firm*—Oliff & Berridge PLC

(57) ABSTRACT

The near-field spectrometer 10 comprises a Z-axis scanner 18, 20 for bringing a sample 24 and the tip of a probe 12 close to each other at a predetermined distance within a near-field 26 region when obtaining near-field spectral information and separating them from each other at a predetermined distance outside a near-field 26 region when obtaining back ground spectral information, and a data processor 22 for obtaining the true near-field spectral information free from the background by subtracting the background spectral information from the near-field spectral information, characterized in that a background information collector, during the separation of the sample 24 and the tip of the probe 12 at a predetermined distance outside the near-field 26 region, obtains the background spectral information for the corresponding portion to be measured.

10 Claims, 17 Drawing Sheets

(A)

(B)

(C)

NEAR-FIELD SPECTROMETER HAVING BACKGROUND SPECTRAL INFORMATION

RELATED APPLICATIONS

The present application claims priority from Japanese Patent Application No. 2001-301989 filed on Sep. 28, 2001, Japanese Patent Application No. 2001-304031 filed on Sep. 28, 2001 and Japanese Patent Application No. 2001-379711 filed on Dec. 13, 2001, all of which are incorporated herein by reference.

FIELD OF THE INVENTION

The present invention relates to a near-field spectrometer and, more particularly, to a background correction in near-field spectroscopy.

BACKGOUND OF THE INVENTION

In recent years, the scanning near-field optical microscope has been developed based on the principle different from the principle for the common optical microscopes or electron microscopes. This microscope can observe the objects that are smaller than the wavelength of light, that has been difficult for the common microscopes and its applications are expected.

This scanning near-field optical microscope is to detect so-called near-field light. For example, when a minute sample is placed on a flat substrate, if a light is incident from the back of the substrate into the sample at an angle which gives rise to the total reflection, the propagated light is wholly reflected but a surface wave called near-field light is generated in the periphery of the surfaces of the substrate and the sample. This surface wave is present locally in the region that is around the sample and within the wavelength of the light.

Then, by inserting a probe having a sharp tip into the field of the near-field wave to scatter the near-field light and measuring the intensity of the scattered light, it is possible to define the distance between the tip of a probe and the surface to be measured of the sample can be grasped.

Therefore, by scanning with the probe keeping the intensity of the scattered light constant, the position of the tip of the probe reflects exactly the concavo-convex (topography) of the surface of the sample. In addition, the tip of the probe is present only in the field of the near-field light and does not contact with the sample itself. Thus, scanning near-field optical microscope is non-contact and non-destructive to the sample and can observe the objects that are smaller than the wavelength of the light.

Also in recent year, by attaching a spectral analyzer etc. to a scanning near-field optical microscope, even the components and the like of a sample can be analyzed as well as the topography information of the surface to be measured of the sample can be grasped. Therefore, a scanning near-field optical microscope is applied to the various fields. For example, the above analysis is performed by bringing the sample and the tip of the probe close to each other within the near-field region to collect the scattered near-field light and by spectrally analyzing the scattered light to obtain the spectral information.

However, even in the case of a near-field spectrometer that can obtain simultaneously the information on the height at each of portion to be measured on the sample and the information on its components, though further improvement of the items such as the precision of the spectral form, the efficiency of measurement has been desired, there has been no appropriate art that can cope with this problem.

SUMMARY OF THE INVENTION

The present invention was conceived in view of the above drawbacks in the prior art and its object is to provide a near-field spectrometer that can obtain efficiently the true spectral information on the sample.

To achieve the above object, the near-field spectrometer of the invention comprises a near-field information collector, a background information collector, a Z-axis scanner and a data processor.

The background information collector is characterized in that it separates in the Z-axis direction the sample and the tip of the probe from each other using the Z-axis scanner and obtain background information on the corresponding portion to be measured during the separation at a predetermined distance outside the near-field region.

The near-field information collector collects the scattered near-field light by bringing the sample and the tip of the probe close to each other within the near-field region, spectrally analyzes the scattered light collected and obtain the near-field spectral information on the sample.

The Z-axis scanner scans the sample and the tip of the probe in the Z-axis direction to separate them from each other and to bring them close to each other. When obtaining the near-field spectral information using the near-field information collector, the sample and the tip of the probe are brought close to each other at a predetermined distance within the near-field region. When obtaining the background spectral information using the background information collector, the sample and the tip of the probe are separated at a predetermined distance outside the near-field region.

The data processor subtracts the background spectral information obtained by the background information collector from the near-field spectral information obtained by the near-field information collector and obtains the true near-field spectral information after the background has been removed.

In addition, a plurality of surfaces to be measured are set on the sample surface to be measured as the portion to be measured for the near-field spectrometer of the invention. The near-field spectrometer of the invention further comprises an XY-axis scanner that scans the tip of the probe above the sample surface to be measured in the directions of the X-axis and the Y-axis that are perpendicular to the Z-axis.

Then, the near-field information collector scans the tip of the probe in the X-axis direction and the Y-axis direction of the surface to be measured using the XY-axis scanner under the situation that the sample and the tip of the probe are brought close to each other using the Z-axis scanner at a predetermined distance within the near-field region, and obtains the near-field spectral information on the surface to be measured.

The background information collector obtains the background spectral information for the surfaces to be measured that are a starting point and/or an arriving point of the tip of the probe during the separation of the sample and the tip of the probe from each other at a distance outside the near-field region by separating them in the Z-axis direction by the Z-axis scanner when the tip of the probe moves to the next surface to be measured.

It is preferable that the data processor subtracts the background spectral information on each of the surfaces to be measured from the near-field spectral information on corresponding surface to be measured and obtains the true near-field spectral information after the corresponding background has been removed, for each of the surface to be measured.

In the invention, a plurality of lines to be measured are set in a one-axis direction in the XY-axis surface on the sample surface to be measured as the portion to be measured.

The near-field spectrometer of the invention also comprises the XY-axis scanner that scans the tip of the probe above the sample surface to be measured in the X-axis and Y-axis direction that are perpendicular to the Z-axis. The near-field information collector obtains the near-field spectral information from each of the lines to be measured one by one.

The background information collector obtains the background spectral information for the lines to be measured that are a starting point and/or an arriving point of the tip of the probe during the separation of the sample and the tip of the probe from each other at a distance outside the near-field region by separating them in the Z-axis direction by the Z-axis scanner when the tip of the probe moves to the next line to be measured.

It is preferable that the data processor subtracts the background spectral information on each of the lines from the near-field spectral information on corresponding line to be measured and obtains the true near-field spectral information after each of corresponding background has been removed, for each of the line to be measured.

In the invention, a plurality of points to be measured are set on the sample surface to be measured as the portion to be measured. The near-field spectrometer of the invention also comprises the XY-axis scanner that scans the tip of the probe above the sample surface to be measured in the X-axis and Y-axis direction that are perpendicular to the Z-axis.

The near-field information collector obtains the near-field spectral information from each of the points to be measured one by one.

The background information collector obtains the background spectral information for the points to be measured that are a starting point and/or an arriving point of the tip of the probe during the separation of the sample and the tip of the probe from each other at a distance outside the near-field region by separating them in the Z-axis direction by the Z-axis scanner when the tip of the probe moves to the next point to be measured.

It is preferable that the data processor subtracts the background spectral information on each of the points from the near-field spectral information on corresponding point to be measured and obtains the true near-field spectral information after each of the corresponding background has been removed, for each of the point to be measured.

In the invention, the near-field spectrometer further comprises a light-distance characteristic collector and a selector. When the background spectral information is obtained using the background information collector, it is preferable that the separation distance in the Z-axis direction between the sample surface and the tip of the probe should be made by the Z-axis scanner the distance selected by the selector.

The light-distance characteristic collector obtains the relation between the light and the distance by obtaining the spectral information on the sample while the separation distance between the sample surface to be measured and the tip of the probe is being changed by the Z-axis scanner.

The selector selects the distance that gives the desired optical property, based on the relation between the light and the distance obtained by the light-distance characteristic collector.

The distance that gives the desired optical property, mentioned above, means the distance at which the background can be removed adequately without degrading the spectral waveform when obtaining the true near-field spectral information.

Further, in the invention, it is preferable that the Z-axis scanner is a moving device that scans the probe and/or a moving stage that mounts the sample and scans the sample.

Further, in the invention, it is preferable that the XY-axis scanner is a moving device that scans the probe and/or a moving stage that mounts the sample and scans the sample.

Further, in the invention, the near-field information collector comprises at least a light source, an optical fiber probe as the probe, a spectroscopy that spectrally analyzes the light scattered by the probe and a detector that obtains the near-field spectral information from the light spectrally analyzed by the spectroscopy.

Preferably, the background information collector comprises at least the light source, the optical fiber probe, the spectroscopy that spectrally analyzes the background light and the detector that obtains the background spectral information from the light spectrally analyzed by the spectroscopy.

It can use either system which uses dispersion element (dispersion type) or which uses interferometer (interferometer type) as the spectrometer in this invention.

DETAILED DESCRIPTION OF THE PREFERRED EMBODIMENT

After vigorous efforts was made by the inventors for the improvement of the precision of the spectral form in near-field spectral analysis, it has been found that the key for solving the problem lies in the removal of the background in the near-field spectral analysis, reduction of the impact of the drift of the apparatuses.

Particularly in the near-field spectral analysis, optical fiber probes are widely used for collecting the near-field light scattered and for the near-field light to seep out from the tip of the probe. However, when light enters into this optical fiber probe, the luminescence of the optical fiber probe is occurred. The precision degradation occurs on the spectral form of the sample because the background produced by the luminescence of the optical fiber probe is superimposed on the spectrum. Thus, the inventors found that, by obtaining the background information at a predetermined distance and correcting the spectrum of the sample, the improvement of the precision of the spectrum form in the near-field spectral analysis is facilitated.

Further, the inventors found that, in order to remove efficiently the impact of this background, obtaining the background information during the moving of the tip of the probe position to a certain portion to be measured, i.e., during the modulation of the position in the Z-axis direction, is preferable in terms of, for example, reduction of measuring time, reduction of the impact of the drift of apparatuses etc. and the inventors have completed the invention.

A preferred embodiment of the invention will now be described referring to the accompanying drawings.

Figure 1:
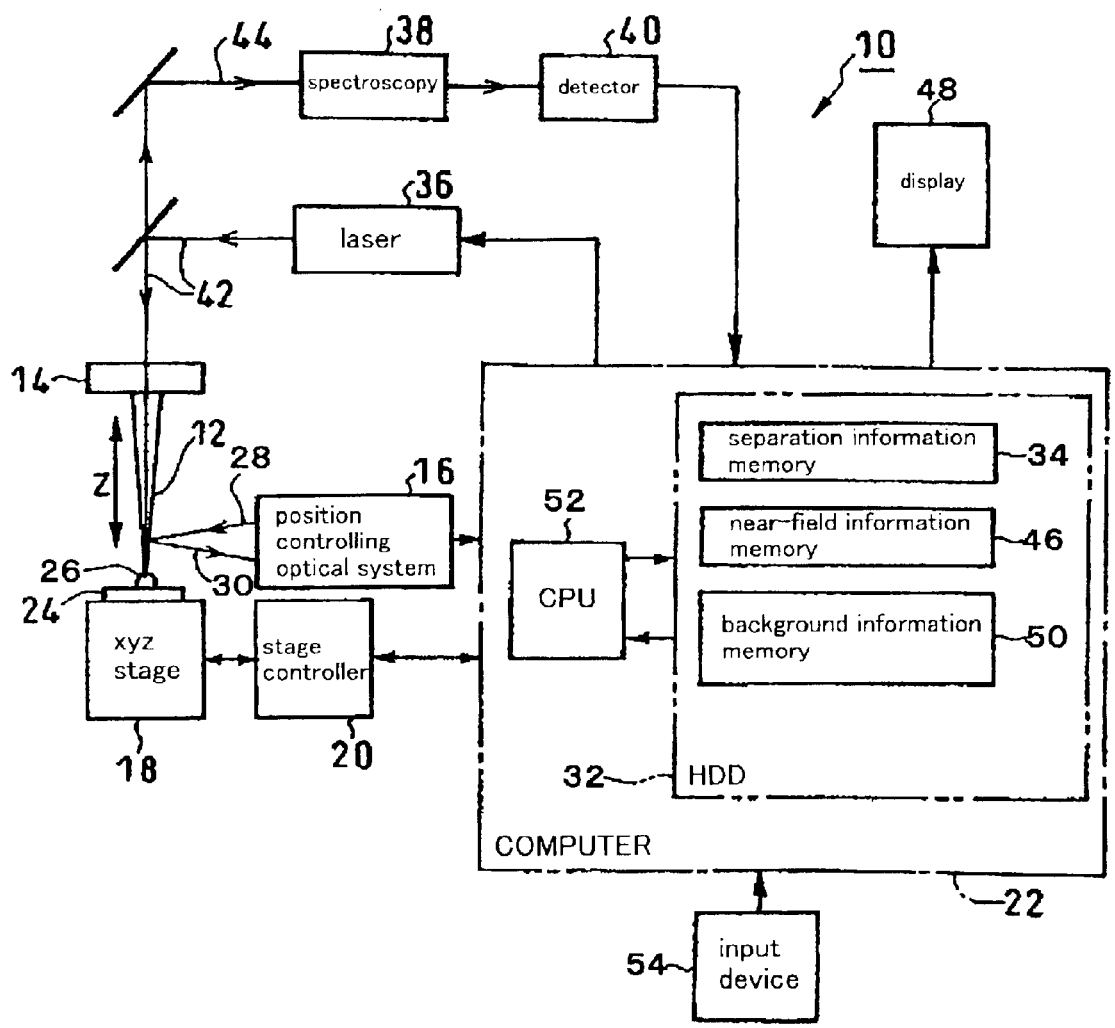
FIG. 1 illustrates a schematic structure of a near-field spectrometer according to an embodiment of the invention.

FIG. 1 shows a schematic structure of a near-field spectrometer according to an embodiment of the invention. In this embodiment, an optical fiber probe is used as the probe that scatters and reflects at the portion to be measured of the sample the near-field light seeped out of the tip.

A near-field optical microscope (near-field spectrometer) 10 shown in the figure comprises a separation information collector and a near-field information collector.

The separation information collector comprises, for example, an optical fiber probe (probe) 12, a near-field head 14, a Z-axis-direction position controlling optical system 16, an XYZ stage (moving stage) 18, a stage controller 20 and a computer (data processor) 22.

The XYZ stage 18, the stage controller 20 etc. scan a sample and the tip of the probe 12 in the Z-axis direction to separate them from each other or bring them closer to each other. When separation information and spectral information are obtained, the sample and the probe 12 are brought closer to each other at a predetermined distance within the near-field region.

In the embodiment, the sample 24 is mounted on the XYZ stage 18 and the probe 12 with a sharp tip is inserted in the field of near-field light 26 to scatter the near-field light 26. At this moment, the probe 12 is micro-vibrated at the resonance frequency by the near-field head 14. Light 28 is emitted to the tip of the probe 12 by the Z-axis-direction position controlling optical system 16. Modulated reflected light 30 from the tip of the probe 12 is detected and the variation of the vibration amplitude of the tip of the probe 12 is detected from the light 30. Maintaining the vibration amplitude of the tip of the probe 12 constant, the scanning of the probe 12 is performed by the drive of the XYZ stage 18 controlled by the stage controller 20. Because of this, from the XYZ stage 18 etc., the XYZ-position information on each of point to be measured and, at the same time, the height information on each of point to be measured are obtained in a separation information memory 34 in a hard disk (HDD) 32 of the computer 22. Therefore, the distance between the tip of the probe 12 and the surface to be measured of the sample 24 is defined.

The near-field information collector comprises, for example, an excitation laser (light source) 36, the optical fiber probe (probe) 12, a spectroscope 38, a detector 40, the computer (data processor) 22, the XYZ stage (the XY-axis scanner, the Z-axis scanner and the moving stage) 18 and the stage controller 20.

Laser light 42 from the excitation laser 36 is injected into the fiber probe 12 and the near-field light 26 seeps out from the opening of the tip of the probe 12. This near-field light 26 is present locally in the region smaller than the wavelength of the light at the tip of the probe 12. When the tip of the probe 12 and the surface to be measured of the sample 24 are brought close to each other to a region smaller than the wavelength of the light (within the near-field region) by the stage controller 20, the near-field light 26 seeped out from the opening of the tip of the probe 12 is scattered and/or reflected at the surface to be measured of the sample 26. The scattered light and/or reflected light 44 is focused from the opening of the tip of the probe 12 and spectrally analyzed (separated into its spectral components) by the spectroscope 38. The spectrally analyzed (separated) light is detected by the detector 40 and its optical intensity is stored in a near-field information memory 46 of the HDD 32 of the computer 22 with the wavelength information obtained from the spectroscope 38.

In this way, the near-field optical microscope 10 can obtain, at the same time, the height information and component information at each of portion to be measured on the surface of the sample by comprising the separation information collector and the near-field information collector. In addition, the computer 22 can display on a display 48 the result of the mapping measurement obtained in the above-mentioned manner.

In such a near-field optical microscope 10, a further improvement of the precision of the spectral form of the sample, efficient measurement etc. has been desired. However, in the conventional near-field optical microscope, the intensity of light signal is mapped and there was no such concept as the background should be corrected.

In the measurement for mapping measurements taking a long time, since the background spectrum varies with time, it was necessary to update the background spectrum in the course of the measurement.

Therefore, the invention is characterized in that the background information is obtained at every move of the tip of the probe to a certain portion to be measured during the mapping measurement, i.e. during the modulation in the Z-axis direction and is used for correcting the corresponding portion to be measured in order to facilitate the improvement of the spectral form of sample, reduction of the measurement time, reduction of the impact of the drift of the apparatuses.

Therefore, in the embodiment, a near-field spectrometer comprises the background information collector, the Z-axis scanner and the data processor.

The background information collector comprises, for example, the excitation laser (light source) 36, the optical fiber probe (probe) 12, the spectroscope 38, the detector 40 and the computer (data processor) 22.

The Z-axis scanner comprises, for example, the XYZ stage (moving stage) 18, the stage controller 20 etc. and scans the sample 24 and the tip of the probe 12 in Z-axis to separate them from each other or bring them close to each other. When obtaining the background information, the sample 24 and the tip of the probe 12 are separated at a predetermined distance outside the near-field region.

Laser light 42 from the excitation laser 36 is injected into the fiber probe 12 and the near-field light 26 seeps out from the opening of the tip of the probe 12. In the situation where the XYZ stage 18 has been driven in the Z-axis direction by the stage controller 20 to separate the distance between the sample 24 and the tip of the probe 12 from each other at a predetermined distance outside the near-field region, the background spectral information is obtained by the spectroscope 38 and the detector 40. The obtained information is stored in a background information memory 50 in the HDD 32 of the computer 22.

The data processor comprises, for example, the computer 22 etc. and a CPU 52 subtracts the background spectral information on a certain portion to be measured of the background information memory 50 from the near-field spectral information on the corresponding portion to be measured in the near-field information memory 46. Thus, the data processor obtains the true near-field spectral information after the background has been removed as to the corresponding portion.

Figure 2:
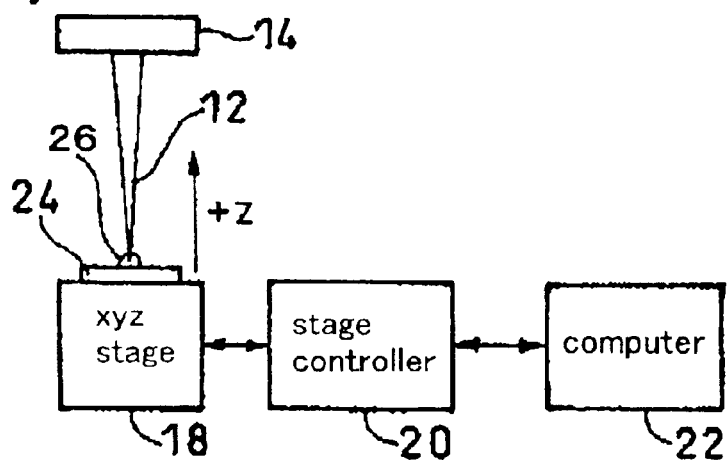
FIG. 2 illustrates the relations between a sample and the position in the Z-axis direction of a tip of the probe when obtaining the near-field spectral information and when obtaining the background spectral information respectively, by the near-field spectrometer shown in FIG. 1.
Figure 2:
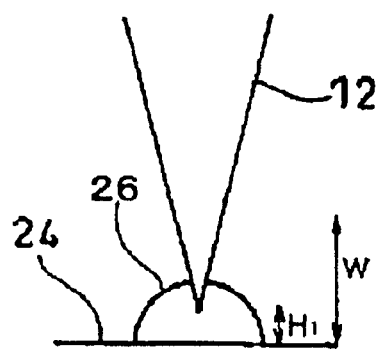
Figure 2:
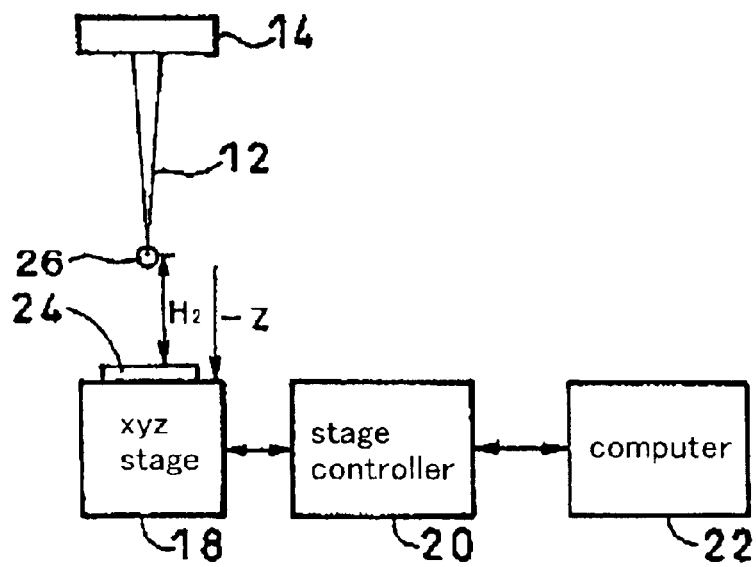

In other words, in the embodiment, when obtaining near-field spectral information on a certain portion, as shown in FIG. 2(A), the XYZ stage 18 is driven by the stage controller 20 upward in the figure (in the direction of +Z) and, as shown in FIG. 2(B), the portion to be measured of the sample 24 and the position of the tip of the probe 12 are brought close to each other at a predetermined distance $H_1$ within a near-field region W such that a separation distance $H_1$ between them becomes the predetermined distance.

In the embodiment, when the position of the tip of the probe 12 is moved to the next portion to be measured after the measurement of the present portion to be measured, as shown in FIG. 2(C), the XYZ stage 18 is moved by the stage controller 20 downward in the figure (in the direction of −Z) and, during a position modulation of the Z-axis direction to make the portion to be measured of the sample 24 and the position of the tip of the probe 12 separated from each other at a predetermined distance $H_2$ outside the near-field region W, the background spectral information on the corresponding portion to be measured is obtained.

In the embodiment, as to a certain portion to be measured, the background spectral information obtained in the situation shown in FIG. 2(C) is subtracted from the near-field spectral information obtained in the situation shown in FIG. 2(B). Therefore, the embodiment can obtain the true near-field spectral information after the background has been removed as to the corresponding portion to be measured. Thus, this procedure as to each of the portions to be measured.

In this way, in the embodiment, during the Z-axis direction modulation while map-measuring, i.e. when the position of the tip of the probe 12 is moved to the next portion to be measured after the near-field spectrum of a certain portion to be measured has been collected, while the sample 24 and the position of the tip of the probe 12 are separated from each other at a predetermined distance $H_2$ outside the near-field region, the background spectral information on the corresponding portion to be measured is obtained.

Therefore, in the embodiment, the impact of the drift of the apparatus system is reduced compared to the conventional method. That is, comparing to the one in which the measurement of the background spectrum is performed separately after the near-field spectral information on all of the portions to be measured has been obtained and the same correction is applied to all of the portions to be measured using single background information, in the embodiment, the impact of the drift of the apparatus system can be reduced.

Thus, comparing to the conventional scheme, in the embodiment, the true near-field spectrum after the impact of the background has been significantly removed can be efficiently obtained for all of the portions to be measured.

Particularly as to the measurement of a plurality of portions to be measured, since the background spectral information is obtained during the Z-axis direction position modulation while map-measuring, the near-field spectral information and the background spectral information can be obtained though the measuring time is almost same as the conventional measuring time in which only the near-field spectral information is obtained.

The background spectral information can be used for the background correction of the near-field spectral information obtained from the portions to be measured that are the starting points and/or the arriving (end) points of the tip of the probe.

Now, a concrete example of various scanning methods of the position of the tip of the probe above the surface to be measured of the sample.

<Surface Scanning>

A plurality of surface to be measured are set in the region to be measured of the sample and the near-field spectral information is obtained by the near-field information collector one by one from each of the surfaces to be measured. That is, a mapping-measurement is performed for each of the surfaces to be measured.

Figure 3:
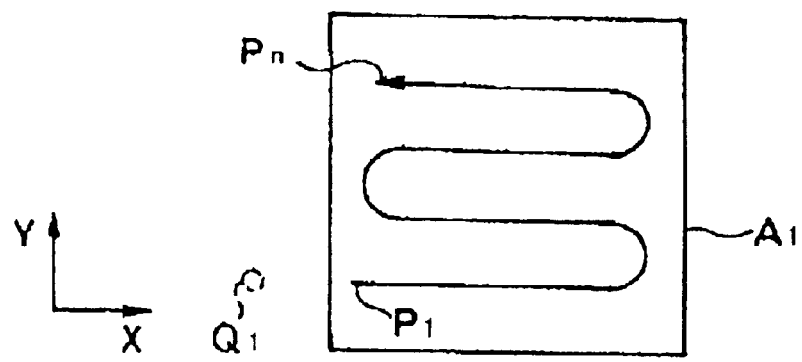
FIG. 3 illustrates the scanning by the near-field spectrometer shown in FIG. 1 for each of surface to be measured.

FIG. 3 shows a surface to be measured as a certain portion to be measured. In FIG. 3, the solid line indicates the trace of the move of the position of the tip of the probe above the surface to be measured during the mapping-measurement while the tip of the probe and the surface to be measured are brought close to each other within the near-field region. The circle indicated by the dotted line is the point to be measured for background under the situation where the tip of the probe and the surface to be measured are separated from each other at a predetermined distance outside the near-field region.

As shown in FIG. 3, the point to be measured for background $Q_1$ for the surface to be measured $A_1$ is set, for example, outside the region of the surface to be measured $A_1$. At this point to be measured for background $Q_1$, the background is obtained by separating the position of the tip of the probe at a predetermined distance outside the near-field region.

After measuring the background, the tip of the probe is positioned above the starting point $P_1$ on a first surface to be measured by the X-axis drive and the tip of the probe is brought close at a predetermined distance within the near-field region on the starting point $P_1$ by the Z-axis drive.

Maintaining the separation distance between the first surface to be measured $A_1$ and the position of the tip of the probe, the position of the tip of the probe is scanned in the X direction and Y direction as the solid line in the figure from the starting point $P_1$ to the arriving point $P_0$ on the first surface to be measured $A_1$ and the near-field spectral information on the first surface to be measured $A_1$ is obtained. At this time, the XYZ coordinates on the surface to be measured $A_1$ are obtained from the XYZ stage etc. and the optical intensity obtained by the detector is stored together with the wavelength information obtained from the spectroscopy. Therefore, the near-field spectral information at each of the portion to be measured on the surface to be measured $A_1$ is obtained.

After the near-field spectral information on the first surface to be measured $A_1$ has been obtained, in order to obtain the near-field spectral information on the next second surface to be measured, on the arriving point $P_n$ of the first surface to be measured, the position of the tip of the probe is separated at a predetermined distance outside the near-field region above the arriving point $P_n$ by the Z-axis direction position modulation and the background spectral information for the second surface to be measured is obtained. After the background spectral information for the second surface to be measured is obtained, the position of the tip of the probe is positioned by the XY-axis drive above the starting point on the next second surface to be measured and the tip of the probe is brought close at a predetermined distance within the near-field region above the starting point by the Z-axis drive.

Maintaining the separation distance between the second surface to be measured and the position of the tip of the probe, same as the first surface to be measured, the position of the tip of the probe is scanned in the X direction and Y direction from the starting point to the arriving point on the second surface to be measured and the near-field spectral information on the second surface to be measured is obtained.

In this way, in the embodiment, during the Z-axis direction position modulation while map-measuring each of surface to be measured, i.e. after obtaining the near-field spectral information on a certain surface to be measured and before obtaining the near-field spectral information on the next surface to be measured, during the separation of the position of the tip of the probe at a predetermined distance, the background spectral information on the surface to be measured of the starting point and/or the arriving point of the position of the tip of the probe is obtained.

Further, in the embodiment, the data processor subtracts the background spectral information on the surface to be measured from the corresponding near-field spectral information and the true near-field spectral information after the background for the surface to be measured has been removed.

As a result, in the embodiment, comparing to the conventional method, the impact of the drift of the apparatus system can be reduced. That is, comparing to the one in which the measurement of the background is performed separately after the near-field spectral information on all of the surfaces to be measured has been obtained and the same correction is applied to all of the surfaces to be measured using single background spectral information, in the embodiment, the impact of the drift of the apparatus system can be reduced. Therefore, the embodiment, comparing to the above conventional method, the true near-field spectrum that the impact of the background for each of the surfaces to be measured has been significantly reduced can be obtained.

In addition, in the embodiment, a plurality of surfaces to be measured are set in the region to be measured of the sample. In the embodiment, when the near-field spectral information is obtained one by one from each of the surfaces to be measured by the near-field information collector, during the Z-axis direction position modulation while map-measuring each of the surfaces to be measured, the background spectral information is obtained. Thus, comparing to the one in which the measurement of the background is performed separately after all of the mapping measurements have been finished, in the embodiment, the measurement time can be reduced significantly to the measurement time almost same as the one only for the mapping measurement.

In the embodiment, the background spectral information obtained can be used for the background correction of the near-field spectral information obtained from the surfaces to be measured of the starting position and/or the arriving point of the position of the tip of the probe.

In the structure described above, an example is described in which the near-field spectral information on a certain surface to be measured is corrected using the background spectral information collected from the point for measuring the background, around the starting point of the surface to be measured. However, the background spectrum collected from the point for measuring the background, around the arriving point of the surface to be measured can be used.

In the embodiment, the background correction can be performed at a desired time if the background correction is performed on the near-field spectral information on each of the surfaces to be measured using the corresponding each of background spectral information.

For example, in the embodiment, every time the near-field spectral information on each of the surfaces to be measured is obtained, it is corrected in real time with the corresponding background spectral information and the result of the mapping measurement can be displayed one by one on the display. In the embodiment, it is also possible that, after the near-field spectral information on all of the surfaces to be measured has been obtained, the correction is performed with the corresponding background spectral information and the result of the mapping measurement is displayed at one time on the display.

<Line Scanning>

Figure 4:
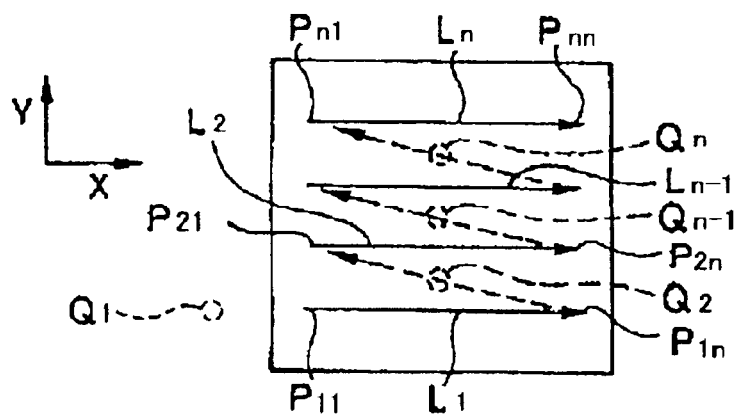
FIG. 4 illustrates the scanning by the near-field spectrometer shown in FIG. 1 for each of line to be measured.

As shown in FIG. 4, a plurality of lines to be measured $L_1$ to $L_n$ are set in the X-axis direction in the figure in the region to be measured of the sample. Then, the near-field spectral information is obtained from each of the lines to be measured $L_1$ to $L_n$ by the near-field information collector. In other words, the mapping measurement for every one of the lines to be measured $L_1$ is performed.

Also in FIG. 4, the solid line shows the trace of the move of the tip of the probe above the sample during the mapping measurement when the tip of the probe and the sample are brought close to each other within the near-field region. The dotted line shows the trace of the move of the tip of the probe when the position of the tip of the probe and the sample are separated from each other at a predetermined distance outside the near-field region. The circle indicated by a dotted line shows the point for measuring the background when the tip of the probe and the sample are separated from each other at a predetermined distance outside the near-field region.

As shown in FIG. 4, an area to be measured of the sample is scanned over for every one of the lines to be measured $L_1$. That is, first, before obtaining the near-field spectral information for the first line to be measured $L_1$, the background spectral information is obtained at the point to be measured $Q_1$ for the background, for the first line to be measured $L_1$ when the position of the tip of the probe and the sample are separated at a predetermined distance outside the near-field region.

After obtaining the background spectral information, the position of the tip of the probe is positioned above the starting point $P_{11}$ of the first line to be measured $L_1$ by the XY-axis drive. At the starting point $P_{11}$ of the first line to be measured $L_1$, the position of the tip of the probe is brought close to the sample within the near-field region by the Z-axis drive and the measurement of the near-field spectral information is started. In other words, maintaining this separation distance, the tip of the probe is scanned in the X-axis direction to the arriving point $P_{1n}$ on the first line to be measured $L_1$. At this time, the XYZ coordinates of the line to be measured $L_1$ is obtained from the XYZ stage etc. and the light intensity obtained by the detector is stored together with the wavelength information obtained by the spectroscopy. Therefore, the near-field spectral information at each of portion to be measured on the line to be measured $L_1$ is obtained.

After obtaining the near-field spectral information on the arriving point $P_{1n}$ on the first line to be measured $L_1$, in order to obtain the near-field spectral information for the next, second line to be measured $L_2$, the position of the tip of the probe at the arriving point $P_{1n}$ is separated at a predetermined distance outside the near-field region by the Z-axis drive. Then, the position of the tip of the probe is moved, for example, in the direction to the left slanting upward by the XY-axis drive and is positioned above the starting point $P_{21}$ on the next, second line to be measured $L_2$.

Here, in the embodiment, while the tip of the probe is separated at a predetermined distance outside the near-field region when the tip of the probe is moved to the next line to be measured, at the moment the tip of the probe is positioned above the point for measuring the background $Q_2$, the background spectral information for the second line to be measured is obtained, for example, at the point for measuring the background $Q_2$.

In the embodiment, during the Z-axis direction position modulation, i.e., after obtaining the near-field spectral information for a certain line to be measured and before obtaining the near-field spectral information for the next line to be measured, while the position of the tip of the probe is separated at a predetermined distance outside the near-field region, the background spectral information for the line to be measured $L_1$ that is the starting point of the position of the tip of the probe and/or for the line to be measured $L_2$ that is the arriving point is obtained.

Then, in the embodiment, the data processor subtracts the background spectral information for a certain line to be measured, from the corresponding near-field spectral information and the true near-filed spectral information for the line to be measured after removing the corresponding background is obtained. In the embodiment, the above procedure is repeated for each of the lines to be measured.

Therefore, in the embodiment, during the separation of the position of the tip of the probe at a predetermined distance outside the near-field region while the Z-axis direction position modulation when the mapping measurement is performed for each of the lines to be measured, the background spectral information for the line to be measured that is the starting point and/or the arriving point of the position of the tip of the probe is obtained. This procedure is repeated for each of the lines to be measured.

As a result, the embodiment can reduce the impact of the drift of the apparatus compared to the above conventional scheme. That is, comparing to the one in which the measurement of the background spectrum is performed separately after the near-field spectral information on all of the lines to be measured has been obtained and the same correction is applied to all of the lines to be measured using single background information, in the embodiment, the impact of the drift of the apparatus system can be reduced. Thus, in the embodiment, the true near-field spectrum after the impact of the background has been significantly removed can be obtained for all of the lines to be measured.

Furthermore, in the embodiment, a plurality of lines to be measured are set in the area to be measured of the sample and, when the near-field spectral information is obtained one by one from each of the lines to be measured by the near-field information collector, during the separation at a predetermined distance outside the near-field region while the Z-axis direction position modulation in the mapping measurement for each of line to be measured, the background information is obtained in such a manner as above. Therefore, in the embodiment, comparing to the one in which the measurement of the background is performed separately, the time necessary for the measurement can be significantly reduced to the time almost same as the time for obtaining only the near-field spectral information.

In the embodiment, a certain background spectral information can be used for the background correction of the near-field spectral information obtained from the lines to be measured of the starting point and/or the arriving point of the position of the tip of the probe.

In the embodiment, the background correction can be performed at a desired time if the background correction is performed on the near-field spectral information on each of the lines to be measured using the corresponding each of background spectral information.

For example, in the embodiment, every time the near-field spectral information for each of the lines to be measured is obtained, it is corrected in real time with the corresponding background spectral information and the result of the mapping measurement can be displayed one by one on the display. In the embodiment, it is also possible that, after the near-field spectral information for all of the lines to be measured has been obtained, the correction is performed with the corresponding background spectral information and the result of the mapping measurement is displayed at one time on the display.

Figure 5:
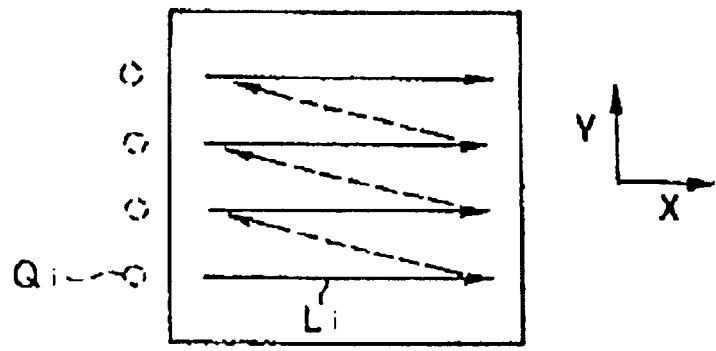
FIG. 5 illustrates the scanning by the near-field spectrometer shown in FIG. 1 for each of line to be measured.

Further, in the embodiment, in terms of reducing the time for measurement, it is preferable to set the point for measuring the background a point for measuring the background on the way to the next line to be measured of move of the position of the tip of the probe, however, if the predetermined separation distance outside the near-field is obtained, another position, for example, the point for measuring the background $Q_1$ as shown in FIG. 5, can be set around the starting point and/or the arriving point of each of line to be measured $L_1$.

<Point Scanning>

Figure 6:
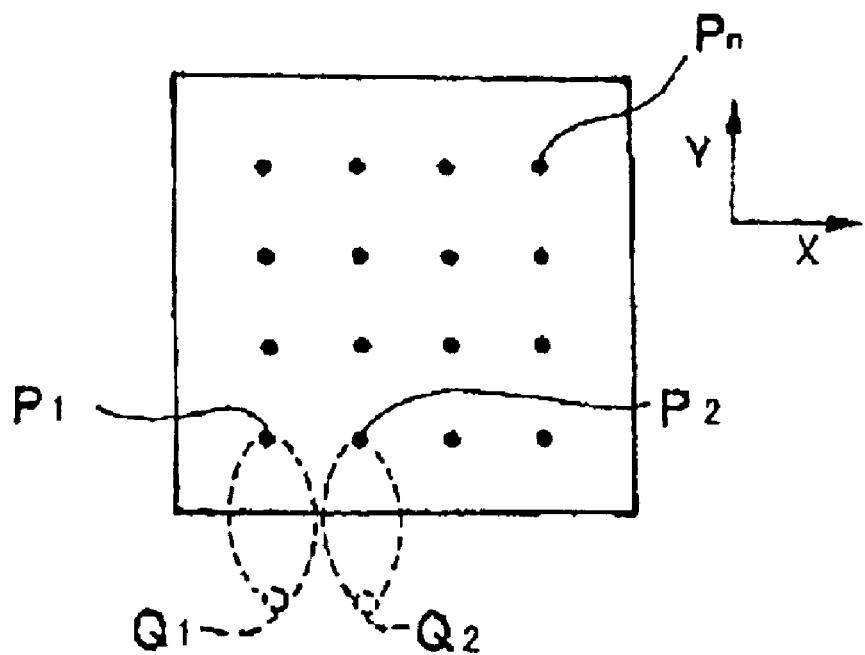
FIG. 6 illustrates the scanning by the near-field spectrometer shown in FIG. 1 for each of point to be measured.

As shown in FIG. 6, a plurality of points to be measured are set in the area to be measured on the sample and the near-field spectral information is obtained one by one from each of point to be measured by the near-field information collector. That is, the mapping measurement for each of the points to be measured is performed.

In FIG. 6, each of point indicated by a solid line designates the point to be measured for obtaining the near-field spectral information when the position of the tip of the probe and the surface to be measured of the sample are brought close to each other within the near-field region. The small circles depicted by the dotted lines show the points to measure the background when the position of the tip of the probe and the surface to be measured of the sample are separated at a predetermined distance outside the near-field region.

As shown in FIG. 6, the area to be measured of the sample is scanned by the tip of the probe for every one of the points to be measured. That is, first, above the first point to be measured $P_1$, the position of the tip of the probe is separated at a predetermined distance outside the near-field region and it is rotated around above the first point to be measured $P_1$ as shown by the dotted line in the figure. During this rotation, at the moment when the position of the tip of the probe is positioned above the point for measuring the background $Q_1$, the background spectral information for the point to be measured $P_1$ is obtained from the point for measuring the background $Q_1$.

In the embodiment, after obtaining the background information from the point for measuring the background $Q_1$, the tip of the probe is positioned above the first point to be measured $P_1$ by the XY-axis drive. Then, the position of the tip of the probe is brought close at a predetermined distance within the near-field region on the first point to be measured $P_1$ by the Z-axis drive and the near-field spectral information is obtained. At this moment, the XYZ coordinates are obtained from the XYZ stage etc. and the light intensity obtained by the detector is stored together with the wavelength information obtained by the spectroscopy. Therefore, the spectral information for the point to be measured $P_1$ is obtained.

In the embodiment, after obtaining the near-field spectral information for the first point to be measured $P_1$, in order to obtain the near-field spectral information for the next second point to be measured $P_2$, above the first point to be measured $P_1$, the position of the tip of the probe is separated at a predetermined distance outside the near-field region by the Z-axis drive and is positioned above the second point to be measured $P_2$ by the X-axis drive.

Above the second point to be measured $P_2$, while the position of the tip of the probe is separated at a predetermined distance outside the near-field region, it is rotated around above the second point to be measured $P_2$ by the XY-axis drive as indicated by the doted line in FIG. 6. During this rotation, at the moment when the position of the tip of the probe is positioned above the point for measuring the background $Q_2$, the background spectral information is obtained for the point to be measured $P_2$ is obtained from the point for measuring the background $Q_2$.

In the embodiment, after obtaining the background spectral information for the point for measuring the background $Q_2$, the position of the tip of the probe is positioned above the second point to be measured $P_2$ by the XY-axis drive. The position of the tip of the probe is brought close at a predetermined distance within the near-field region above the second point to be measured $P_2$ by the Z-axis drive. The near-field spectral information for the second point to be measured $P_2$ is obtained.

In this way, in the embodiment, during the modulation of the position in the Z-axis direction while each of point to be measured is map-measured, i.e., after the near-field spectral information for a certain point to be measured is has been obtained and before the near-field spectral information for the next point to be measured is obtained, when the position of the tip of the probe is separated at a predetermined distance outside the near-field region, the background spectral information for the point to be measured of the starting point and/or the arriving point of the position of the tip of the probe is obtained.

In addition, in the embodiment, the data processor subtracts the background spectral information for a certain point to be measured from the corresponding near-field spectral information and the true near-field spectral information after the corresponding background has been removed for the point to be measured. This procedure is repeated for each of the point to be measured.

Therefore, in the embodiment, during the separation of the position of the tip of the probe at a predetermined distance outside the near-field region while the move to the next point to be measured when it is modulated in the Z-axis direction position when the mapping measurement for each of the point to be measured is conducted, the background spectral information for the point to be measured of the starting point and/or the arriving point of the position of the tip of the probe is obtained and this procedure is repeated for each of the points to be measured.

As a result, comparing to the one in which the measurement of the background is performed separately after the near-field spectral information for all of the points to be measured has been obtained and the same correction is applied to all of the points to be measured using single background information, in the embodiment, the impact of the drift of the apparatus system can be reduced. Therefore, in the embodiment, the true near-field spectral information after the corresponding background has been removed for the point to be measured.

In addition, in the embodiment, a plurality of points to be measured are set in the region to be measured of the sample. When the near-field spectral information is obtained one by one from each of the points to be measured by the near-filed information collector, the background spectral information is obtained as described above during the modulation of the Z-axis direction position while the mapping measurement is performed for each of the points to be measured. Thus, in the embodiment, comparing the one in which the measurement of the background is performed separately, the time necessary for the measurement can be reduced to the one that is necessary only for the ordinary mapping measurement.

In the embodiment, the background spectral information obtained during the move of the position of the tip of the probe from the point to be measured of the starting point to the one of the arriving point can be used to correct the background of the near-field spectral information obtained either from the starting point or from the arriving point of the position of the tip of the probe.

In the embodiment, the background correction can be performed at a desired time if the background correction is performed on the near-field spectral information for each of the points to be measured using the corresponding each of background spectral information.

In the embodiment, for example, every time the near-field spectral information on each of the points to be measured is obtained, it is corrected in real time with the corresponding background spectral information and the result of the mapping measurement can be displayed one by one on the display. In the embodiment, it is also possible that, after the near-field spectral information for all of the points to be measured has been obtained, the correction is performed using the corresponding background spectral information and the result of the mapping measurement is displayed at one time on the display.

Figure 7:
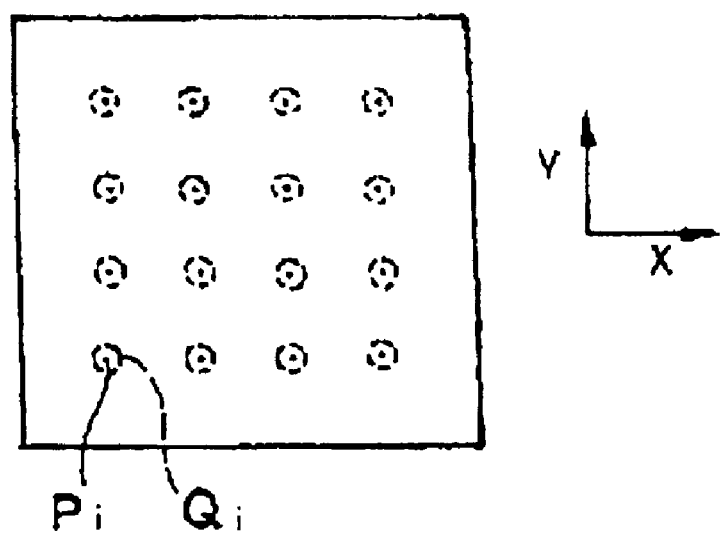
FIG. 7 illustrates the scanning by the near-field spectrometer shown in FIG. 1 for each of point to be measured.

In the structure described above, an example in which the background spectral information for a certain point to be measured is obtained while the position of the tip of the probe is rotated around above the corresponding point to be measured at a predetermined separation distance. However, the invention is not limited to this example. For example, without rotating the tip of the probe above a point to be measured at a predetermined separation distance, as shown in FIG. 7, from the point for measuring the background $Q_1$ separated at a predetermined separation distance outside the near-field region, the background spectral information for the corresponding point to be measured $P_1$ can also be obtained.

As described above, the near-field spectrometer according to this embodiment, during the modulation for the Z-axis direction position while the mapping measurement of a plurality of each of portion to be measured, i.e., during the separation of the position of the tip of the probe at a predetermined distance outside the near-field region while moving to the next portion to be measured, the background spectral information for the background correction for the portion to be measured of the starting point and/or the arriving point of the position of the tip of the probe is obtained. Then, this procedure is repeated for each of the portion to be measured.

As a result, in the embodiment, comparing to the conventional scheme, the impact of the drift of the apparatus system is reduced and the true near-field spectrum can be obtained for each of the portions to be measured after the impact of the background has been removed.

Furthermore, in the embodiment, a plurality of portions to be measured are set in the region to be measured of the sample and, when the near-field spectral information is obtained one by one from each of the point to be measured by the near-field information collector, during the separation of the position of the tip of the probe at a predetermined distance outside the near-filed region while moving to the next portion to be measured, the background spectrum is obtained as described above. Thus, in the embodiment, comparing to the one in which the background measurement is performed separately, the time necessary for measurement can be significantly reduced to the one necessary for the ordinary mapping measurement.

<Light-Distance Characteristics>

In the near-field spectrum analysis, when the probe and the sample are away from each other, it is considered that the signal from the sample is weakened significantly. However, in the conventional apparatus, the function for measuring specifically how strong the spectrum is at how large distance has not been included.

On the other hand, if the background correction is not performed carefully considering the relation between the property of light and the distance in the near-field spectral analysis, this procedure rather causes the degradation of the near-field spectrum waveform or the background correction can not be performed adequately etc. than it removes the background. Thus, the relation between the light and distance in the near-field spectral analysis is important especially when a background is defined.

Figure 8:
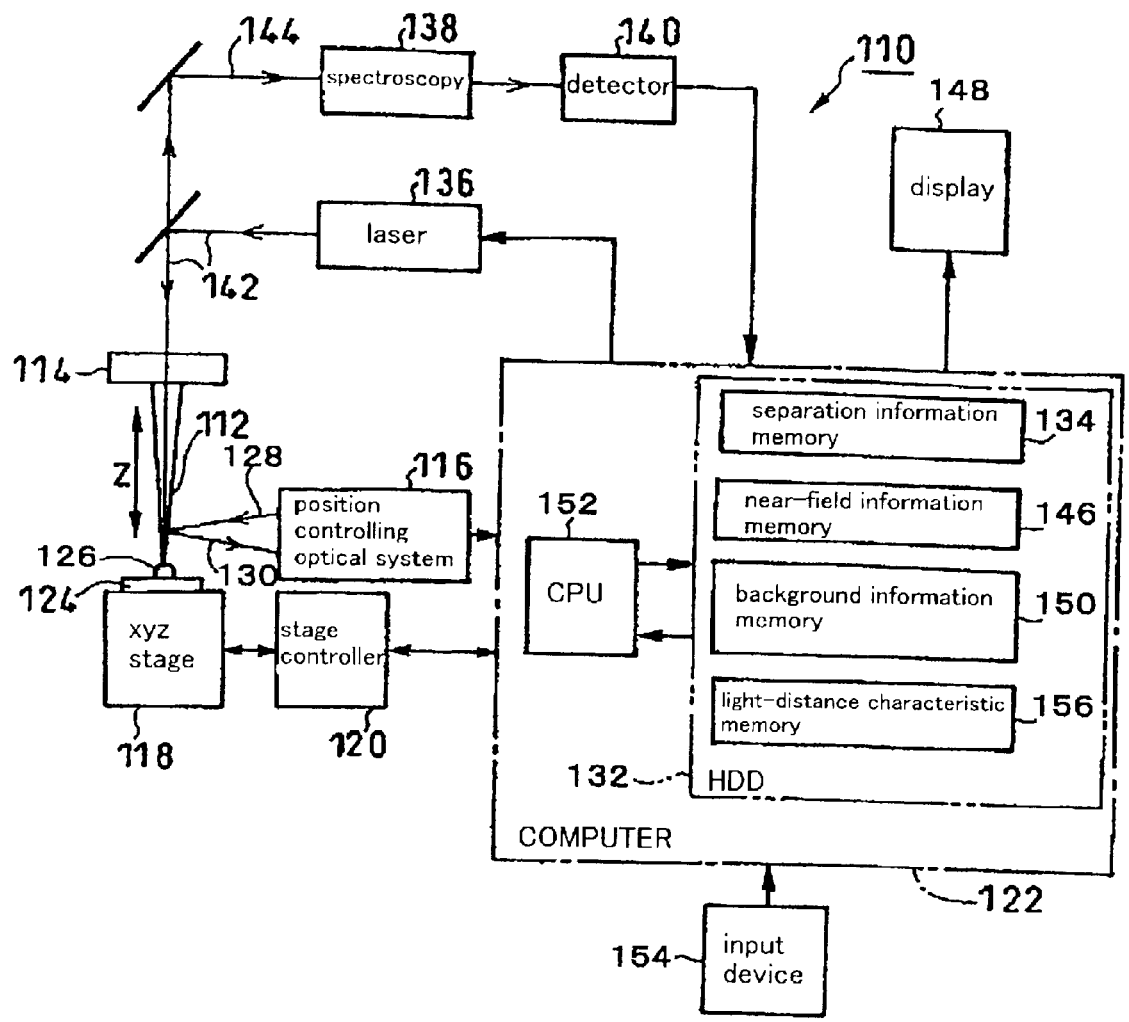
FIG. 8 illustrates a light-distance characteristic measuring device suitable for use in the near-field spectrometer shown in FIG. 1.

Then, in the embodiment, the relation between the light and the distance is measured as described above, as shown in FIG. 8, a light-distance characteristic collector and a selector are included. As to the items corresponding to the ones in FIG. 1 above, a numeral 100 is added to indicate accordingly and the description is omitted.

The light-distance characteristic collector comprises, for example, the excitation laser 136, the optical fiber probe 112, the spectroscope 138, the detector 140, the computer 122, the XYZ stage 118 and the stage controller 120.

In this embodiment, when the tip of the probe 112 and the surface to be measured of the sample 124 are brought close within a region narrower than the wavelength (within the near-field region) by the stage controller 120, the near-field light 126 seeped out of the tip of the probe 112 is scattered or reflected at the surface to be measured of the sample 124. The scattered or reflected light 144 is collected from the opening at the tip of the probe 112 and spectrally analyzed by the spectroscope 138. The analyzed light is detected by the detector 140. The intensity of the light is stored in a light-distance characteristic memory 156 of a HDD 132 of the computer 122 together with the wavelength information obtained by the spectroscope 138.

At this moment, in the embodiment, the XYZ stage 118 is driven in the Z-axis direction by the stage controller 120 and the spectral information is obtained changing the separation distance between and the surface to be measured of the sample 124 and the tip of the probe 112. This spectral information is stored in the light-distance characteristic memory 156 together with the Z-axis coordinate obtained from the stage controller 120 etc.

Figure 9:
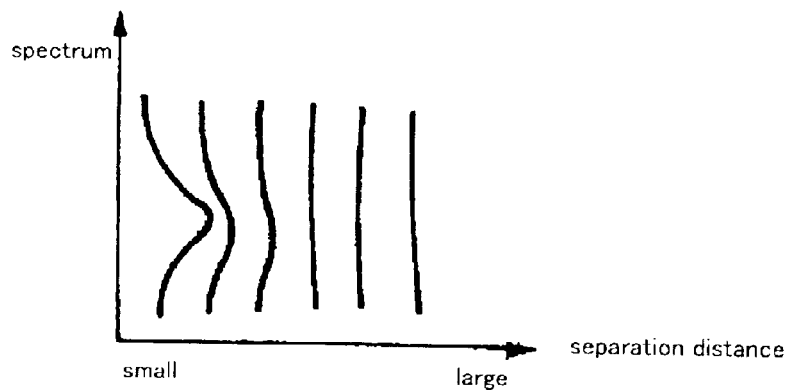
FIG. 9 illustrates a light-distance characteristic obtained by the light-distance characteristic measuring device shown in FIG. 8.

In this way, the relation between the light and the distance as shown in FIG. 9 is obtained. As shown in FIG. 9, for example, as the separation distance between the position of the tip of the probe and the surface to be measured of the sample becomes shorter, the undulations in the obtained spectrum becomes more but as the distance becomes longer, the spectrum becomes flat. The relation between the light and the distance can be obtained.

The selector comprises, for example, an input device 154 etc. and selects a distance with which the desired distance can be obtained based on the relation between the light and the distance stored in the light-distance characteristic memory 156. For example, the relation between the light and the distance as shown in FIG. 9 is displayed on a display 148 and, watching it, the operator can select on an input device 154 etc. the distance with which the desired light characteristic can be obtained. Accordingly, the distance with which the background should be measured can be accurately selected.

In the embodiment, When the background spectral information is performed by the background information collector, a CPU 152 accesses the light-distance characteristic memory 156 and sets the separation distance between the sample and the tip of the probe the distance with which the desired light characteristic selected as described above is obtained. Thus, the separation distance between the tip of the probe that measures the background and the sample can be obtained accurately and the background can be obtained with an accurate predetermined distance. Therefore, the degradation of the spectral information for the background correction in the near-field spectral analysis can be significantly reduced.

Furthermore, in the embodiment, when the distance between the tip of the probe 112 and the surface of the sample 124 is larger than the distance with which the near-field light generated at the tip of the probe 112 interacts with the surface of the sample 124, the spectrum can be obtained but the shapes of the peaks are different. When the tip of the probe and the surface of the sample 124 are brought closer, the peaks of the spectrum obtained may sometimes vary suddenly. This can be recognized as the interaction between the near-field light generated at the tip of the probe and the surface of the sample.

In the above structure, the example using an optical fiber probe as the probe has been described but any desired probe can be applied. Also, in the above structure, an illumination-collection-mode has been described as an example but any desired measurement mode can be applied. The same effect as the above structure can be obtained especially when a total reflection prism is provided and is applied to the total reflection measurement.

In the embodiment, an example in which the position of the probe is fixed and the XYZ stage is moved has been described, the XYZ stage can be fixed and a moving device for moving the position of the probe can be used.

In the embodiment, the expression "spectral information" has been used. This expression can be used in both of the cases where the spectrum is obtained by performing a reverse Fourier transformation on the interferogram and the background correction is performed on the spectrum obtained and where the background correction is preformed on the interferogram and the spectrum without the background is obtained by performing a reverse Fourier transformation on the interferogram without the background.

In each of the above structures, an example has been described in which, when moving to each of portion to be measured, after the position of the tip of the probe is, first, separated upward to a predetermined distance above the portion to be measured of the starting position only by the Z-axis drive, it is moved to the next portion to be measured only by the XY-axis drive. However, the tip of the probe can be moved simultaneously from the near position of the portion to be measured of the starting point to the separation position of the portion to be measured of the arriving point by combining the Z-axis drive and the XY-axis drive.

In each of the above structures, it is assumed that the operation conditions of each of device when obtaining the near-field spectral information and when obtaining the background spectral information are basically same except for the operation of the devices relating to the scanning of the sample and the probe.

In the above configurations, the dispersion type is used as the spectrometer, but the spectrometer is not limited to the dispersion type, interferometer type can be used.

As has been described above, according to the near-field spectrometer of the invention, during the separation of the sample and the tip of the probe from each other at a predetermined distance outside the near-field region by separating them from each other in the Z-axis direction by the Z-axis drive, the background spectral information for the portion to be measured is obtained by the background information collector and, then, the near-field spectral information for the corresponding portion to be measured is corrected by the data processor.

As a result, the invention can reduce the impact of the drift and the background can be efficiently removed from the near-field spectral information.

In the invention, the relation between the spectrum and the distance is obtained by the light-distance characteristic collector changing the distance between the sample and the tip of the probe by the Z-axis scanner. Therefore, in the invention, the distance between the sample on which the background should be measured and the tip of the probe can be obtained accurately. In this way, in the invention, the degradation of the spectral information can be significantly reduced when the background correction is performed in the near-field spectral analysis.

The present invention is not limited to the above configurations but could variously be modified without departing from the scope and spirit of the present invention. In the embodiment, it is preferable to use, for example, the mechanisms which follow.

XYZ Stage

In the embodiment, for example, it is preferable to use the devices listed below as the positioning device such as the XYZ stage.

The near-field measurement devices such as probe microscopes represented by atomic force microscope, scanning tunnel microscope and near-field microscope including the above-described near-field spectrometer and near-field microscope often use piezoelectric stages for their nano-scale fine positioning as the above-described XYZ stage.

However, though the piezoelectric stage can position in nano-scale, it has a problem in the absolute precision and repeatability such as creep and hysteresis. For example, even though the order to stop the drive of the piezoelectric stage is issued by the stage controller, the piezoelectric stage is not stopped still exactly at the position to be stopped but a creeping occurs in which the stage slowly and gradually moves in the direction of its drive shaft with time.

Especially as for the property of creeping, it is often coped with by employing a method in which the amount driven of the stage is measured directly by another device and correction is performed or a method in which a standard sample is measured and the obtained result is converted based on the result of the measurement of the standard sample. However, the former method has drawbacks such as that the apparatus becomes complicated because hardware for measuring the position is necessary separately, the environment for installation is limited. In the latter method, the correction performed in it is not a correction strictly speaking because it is based on the measurements that have difference in time and position from the actual measurements. Especially in near-field measurement apparatuses, this problem has been more serious because they move their probes or stages within a fine range such as the wavelength of light.

Therefore, in near-field measurement apparatuses, reduction of drift of especially the positioning device is very important.

Thus, in the near-field measurement apparatuses including above near-field spectrometer and, for example, near-field microscope, it is very preferable that a positioning device as described below is provided in the desired direction of drive axis of the probe and/or stage.

That is, a first positioning device used advantageously in the embodiment comprises a piezoelectric stage which mounting a sample and is moving in the direction of a specific axis and a stage controller moving the piezoelectric stage in the direction of the specific axis, wherein the positioning device comprises a creeping property memory. The stage controller applies an electric signal complementary to the creeping property in the creeping property memory to the piezoelectric stage together with the timing information on the creeping property and drives the piezoelectric stage in the direction of drive axis.

Here, a creeping in the direction of the drive axis of the piezoelectric stage with time has been measured and the creeping property has been formulated in advance and the creeping property memory stores the formulated creeping property.

A second positioning device used advantageously in the embodiment comprises a creep property memory, a measuring device and a correction device.

Here, a creeping in the direction of the drive axis of the piezoelectric stage with time has been measured and the creeping property has been formulated in advance and the creeping property memory stores the formulated creeping property.

The measuring device obtains, with timing information, position information on the piezoelectric stage from the portions to be measured of the sample mounted on the piezoelectric stage.

The correction device, employing the timing information on the creeping property, corrects the result measured by the measuring device in terms of software for the drive axis direction of the piezoelectric stage and a result of the measurement without the impact of the creeping of the piezoelectric stage is obtained.

It is preferable that the creeping property of the piezoelectric stage can be represented by the following Expression 1.

$$r \times (1 + \gamma \times \log(t/0.1)) \qquad \text{(Expression 1)}$$

where, r is a constant calculated using the data obtained by the measuring device.

γ is a constant calculated using the data obtained by the measuring device.

t is the timing information.

The timing information t is, for example, the time passed from the moment when the drive of the piezoelectric stage has been stopped by the stage controller etc. or the time passed from the moment when some time has passed from the moment when the drive of the piezoelectric stage has been stopped etc.

The creeping property shown by the above Expression 1 takes time as the unit on the axis of abscissa and the Z-axis position information as the unit on the axis of ordinate. In contrast, the unit on the axis of ordinate of the result measured is Z-axis position information. However, though the unit of the axis of abscissa is, for example, X-axis position information, for example when the X-axis information is obtained, by obtaining it together with the time period information related to the timing information t in the expression for the creeping property or the time information, relating can be performed between the units of the axes of abscissa and ordinate of expression of the creeping property and the result measured by, for example, the conversion of the units between the time-axis and position-axis.

The measuring device obtains an image for one surface. It also comprises a constant determiner that, after one surface image has been obtained, selects properly a plurality of points on the obtained image and calculates the values r, γ in the expression of the creeping property. It is preferable that the correction device corrects with the values obtained by the constant determiner in terms of software the data of the entire image obtained by the measuring device according to the creeping property in which the constants r and γ in the expression in the creeping property memory are substituted by the corresponding value obtained by the constant determiner and obtains the result measured after the impact of the creeping of the stage has been removed.

The measuring device obtains an image for one line. It also comprises a constant determiner that, after one line image has been obtained, selects properly a plurality of points on the obtained image and calculates the values r, γ in the expression of the creeping property. The correction device corrects with the values obtained by the constant determiner in terms of software the data of the line obtained by the measuring device according to the creeping property in which the constants r and γ in the expression in the creeping property memory are substituted by the corresponding value obtained by the constant determiner and obtains the result measured after the impact of the creeping of the stage has been removed. Then it displays the corrected result measured. It is preferable that the measurement by the measuring device, the calculation of the constants by the constant determiner, correction in terms of software by the correction device and corrected result measured are displayed for each of line.

Now, a positioning device preferably used in the piezoelectric stage in the embodiment will be described. In the embodiment, a near-field spectral analyzer is assumed as a near-field spectrometer. Then, an example will be described in which, by correcting in terms of software the information on the topography of the surface to be measured of a sample obtained by the near-field spectrometer, the impact of the creeping of the piezoelectric stage is corrected. As to the items corresponding to the ones in FIG. 1 above, a numeral 200 is added to indicate accordingly and the description is omitted.

Figure 10:
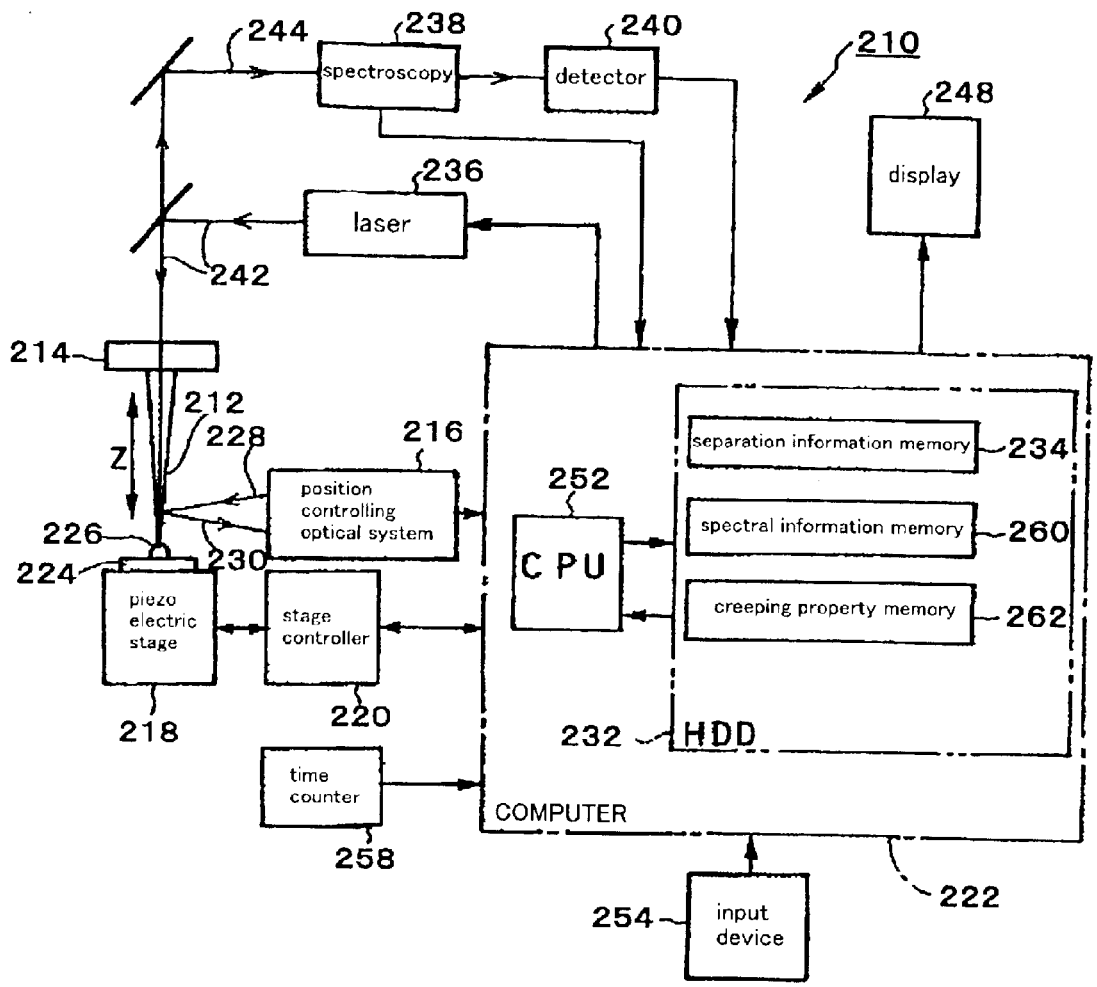
FIG. 10 illustrates schematic structure of a near-field spectrometer using a positioning device preferable in the embodiment.

A near-field spectrometer 210 in FIG. 10 comprises a separation information collector (measuring device) and a spectral information collector.

The separation information collector comprises, for example, an optical fiber probe 212, a near-field head 214, a Z-axis direction position controlling optical system 216, a XYZ piezoelectric stage (positioning device) 218, a stage controller (positioning device) 220 and a computer (positioning device) 222.

The XYZ piezoelectric stage 218 and the stage controller 220 etc. scans a sample 224 and the tip of the probe 212 in the Z-axis direction to bring them close to each other or separate them from each other and brings the sample 224 and the tip of the probe 212 close to each other at a predetermined distance within the near-field region, when the separation distance information and the spectral information are obtained.

In the embodiment, the sample 224 is mounted on the XYZ piezoelectric stage 220 and the probe 212 with a sharp tip is inserted into a near-field light 226 to scatter the near-field light 226. At this moment, the probe 212 is micro-vibrated at its resonance frequency by the near-field head 214. Light 228 is emitted to the tip of the probe 212 by the Z-axis direction position controlling optical system 216. Modulated reflected light 230 from the tip of the probe 212 is detected and the variation of the vibration amplitude of the tip of the probe 212 is detected from the light 230. Maintaining the vibration amplitude of the tip of the probe 212 constant, the probe 212 is scanned by the drive by the XYZ piezoelectric stage 218 by the stage controller 220. Thus, XYZ position information for each of the points to be measured from the XYZ piezoelectric stage 218, the time at which the measurement has been performed from a time counter 258 and, at the same time, topography information at each of the point to be measured are obtained in a separation information memory 234 of a hard disk (HDD) 232 of the computer 222. In this way, the distance between the tip of the probe 212 and the surface to be measured of the sample 224 can be determined.

The spectral information collector comprises, for example, an excitation laser 236, an optical fiber probe 212, a spectroscope 238, a detector 240, the XYZ piezoelectric stage 218, the stage controller 220 and the computer 222.

Laser light 242 from the excitation laser 236 is injected in the fiber probe 212 and the near-field light 226 seeps out from the opening of the tip of the probe 212. The near-field light 226 is present locally in a region narrower than the wavelength of the light from the tip of the probe 212. When the tip of the probe 212 and the surface to be measured of the sample 224 are brought close to each other at a distance narrower than the wavelength of the light by the stage controller 220, the near-field light 226 seeped out from the tip of the probe 212 is scattered or reflected at the surface to be measured of the sample 224. The scattered or reflected light 244 is collected from the opening of the tip of the probe 212 and is analyzed by the spectroscope 238. The analyzed light is detected by the detector 240 and its optical intensity is stored in the spectral information memory 260 of HDD 232 of the computer 222 together with the wavelength information obtained from the spectroscope 238.

By structuring the near-field spectrometer 210 this way, the topography information and component information at each of portion to be measured of the sample surface can be obtained at the same time and displayed on a display 248.

Though the piezoelectric stage 218 can position in nanoscale, for example, creeping may occur in which even though the order to stop the drive of the piezoelectric stage 218 is issued by the stage controller 220, the piezoelectric stage 218 is not stopped still exactly at the position to be stopped but the stage 218 slowly and gradually moves in the direction of its drive axis with time. Especially as for the case of the measuring device of near-field, this problem is more serious because the probe or stage is moved within a region narrower than the wavelength of light.

Figure 11:
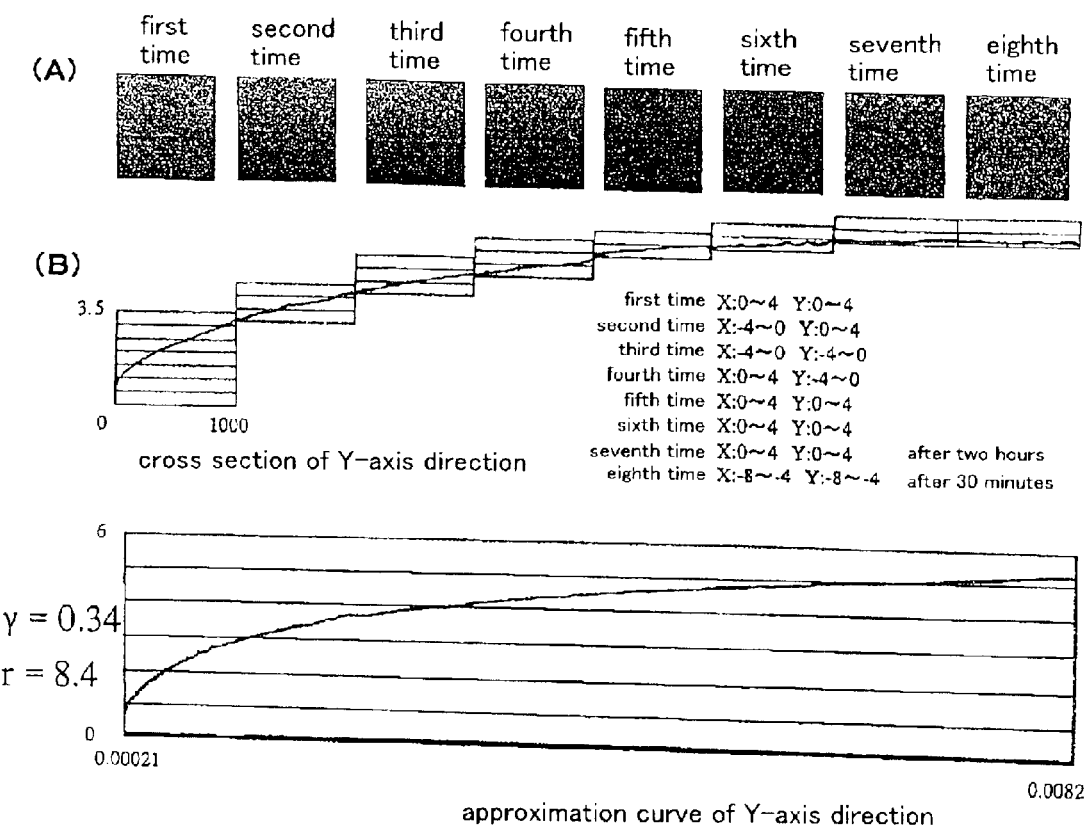
FIG. 11 illustrates an example of a measurement of the creep property of the piezoelectric stage shown in FIG. 10.

Then, in the invention, the creeping property is measured and formulated in advance in order to correct accurately the impact of the drift of the piezoelectric stage with a simple structure. In the embodiment, for example, as shown in FIG. 11(A), every time a predetermined period of time t has passed from the moment the drive of the piezoelectric stage was stopped by the stage controller, one image is obtained from the same surface to be measured. This procedure is repeated, for example, eighth times. Then, a creeping property as shown in FIG. 11(B) is obtained. This procedure is formulated and is used to correct, based on the theoretical curve obtained, the separation information on the separation information memory 234, i.e., the topography information on the surface to be measured of the sample 224.

$$r \times (1 + \gamma \times \log(t/0.1)) \quad \text{(Expression 2)}$$

where, r is a constant calculated using the data obtained by the near-field spectrometer 210.

γ is a constant calculated using the data obtained by the near-field spectrometer 210.

t is the time period that has passed from the moment at which the drive of the piezoelectric stage 218 was stopped by the stage controller 220.

Therefore, in the embodiment, the near-field spectrometer 210 comprises the creeping property memory 262 storing the expression of the creeping property of above Expression 2 and CPU 252 as the constant determiner and the correction device in terms of software.

First, the topography information is obtained from each of the portions to be measured of the sample 224 mounted on the piezoelectric stage 218 by the separation information collector and one image for the surface is obtained. The image obtained is stored in the separation information memory 234.

As a function of the constant determiner, CPU 252 selects properly a plurality of points from the one image of the surface obtained as above and the value of the constants r and γ in the expression of the creeping property are calculated. For example, γ=0.34 and r=8.4 are obtained. These values are stored in the creeping property memory 262. The formulated creeping property created by measuring the creeping property in advance is stored for the XYZ axes of the piezoelectric stage 218.

Then, as a function of the correction device, CPU 252 substitute the constants r and γ of the expression of the creeping property with the values, r and γ in the expression of the creeping property stored in the creeping property memory 262, for example, the values of the constants γ=0.34 and r=8.4 and the creeping property for, for example, Z-axis direction is obtained. According to the creeping property obtained, the data of the entire image in the separation information memory 234 is corrected in terms of software and the result of the measurement without the impact of the creeping is obtained.

The creeping property represented by the Expression 2 has the axis of abscissa taking time as its unit and the axis of ordinate taking Z-axis position information as its unit. In contrast, the units on the axes of abscissa and ordinate of the result measured are, for example, time. However, in the embodiment, as described before, the time at which the X-axis information is obtained is obtained together with the time information related to the timing information t of the expression of the creeping property by, for example, the time counter 258. Thus, the relating of the units of the axis of the expression of the creeping property and, for example, the X-axis position information on the separation information memory 234 can be performed, for example, by the conversion of the units on the axes between the time axis and position axis.

Figure 12:
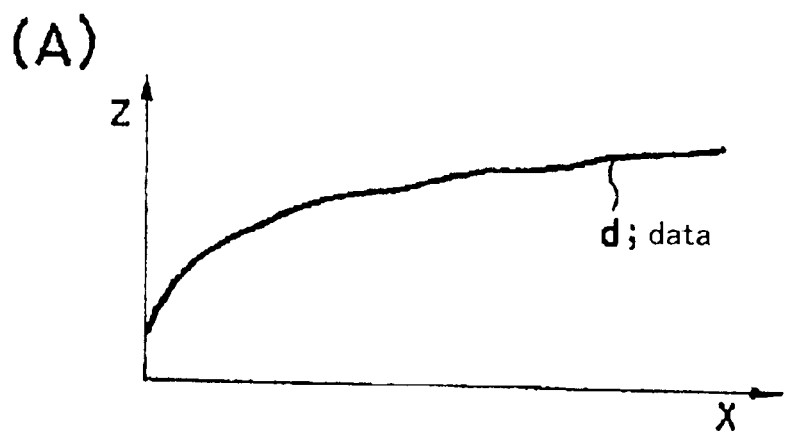
FIG. 12 illustrates a software correction method by the standard equation of the creep property of the measurement result obtained by the near-field spectrometer shown in FIG. 10.
Figure 12:
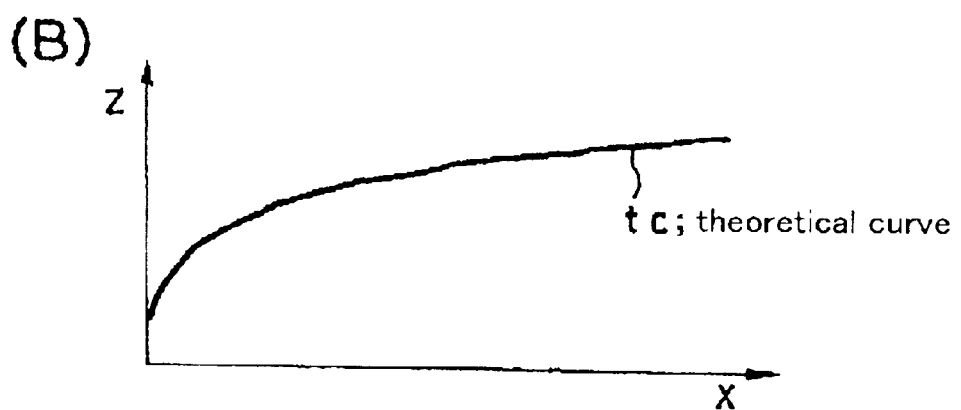
Figure 12:
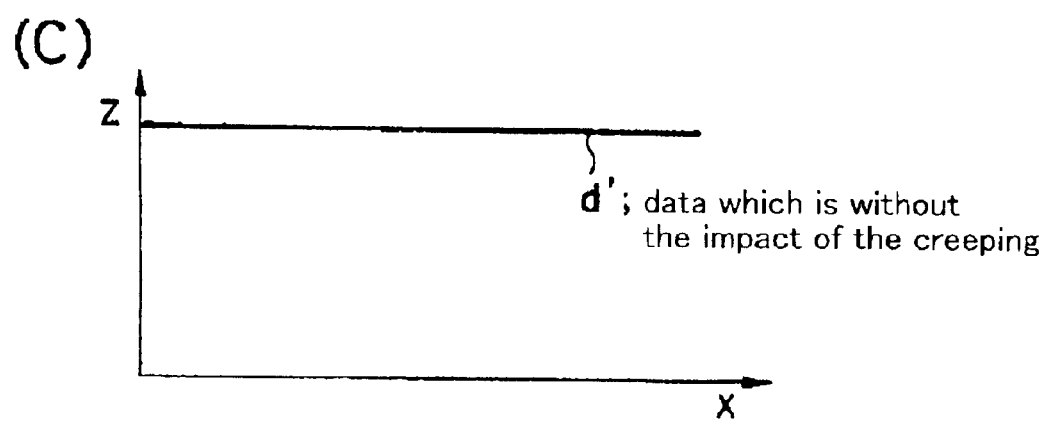

Then, taking into consideration such relating of the units of axes, by dividing a data d of the separation information memory, for example, as shown in FIG. 12(A) by the theoretical curve tc of the creeping property as shown FIG. 12(B), data d' which is without the impact of the creeping can be obtained as shown in FIG. 12(C).

In this way, in the embodiment, the formulation of the creeping property of the piezoelectric stage 218 has been succeeded in and, based on its theoretical curve, the entire result measured is corrected in terms of software and the impact of the creeping is corrected. Thus, in the embodiment, the result measured can be corrected accurately. In addition, in the embodiment, the structure is simple because it corrects in terms of software using the theoretical curve.

Furthermore, by using the piezoelectric stage 218 described above as the XYZ stage of the near-field spectrometer, the high precision drive of the probe 212 and the piezoelectric stage 218 can be performed and, therefore, a result measured with higher precision can be obtained.

In the structure described above, an example has been described in which on image of the surface is obtained by the measuring device but the invention is not limited to this example and, instead of the example, one image is obtained for every one line by the measuring device. Then, after one image for one line has been obtained, a plurality of points are selected on the image and the values of the constants r and γ in the expression of the creeping property are calculated by the constant determiner. Then, the data of the line obtained by the measuring device is corrected by the correction device in terms of software according to the creeping property in which the constants r and γ of the expression of the creeping property memory are substituted with the corresponding values obtained by the constant determiner and the result measured without the impact of the creeping of the piezoelectric stage is obtained. The result measured after correction is displayed on the display. The measurement by the measuring device, the calculation of the constants by the constant determiner, the correction in terms of software by the correction device and the result measured after correction can also be displayed for each of line. Thus, in the embodiment, The result of the correction can be displayed on the display one by one, for example, every time the measurement for each of line has been finished.

Also, in the above structure, an example has been described in which the positioning device is used as the stage of the near-field spectrometer but the invention is not limited to this example and the positioning device can be used for any desired apparatuses. The positioning device is preferable for use as the stage of a probe microscope, for example, atomic force microscope, scanning tunnel microscope and near-field microscope that require precise positioning.

The positioning device can also be used for driving the probe or stage of a near-field microscope comprising a scattered light collector that collects the scattered light generated by inserting the probe into the field of the near-field light of the surface to be measured of the sample, a stage on which the sample is mounted and a observing device that observes the image of the sample using the scattered light of the near-field light collected by the scattered light collector.

In this way, also by using the piezoelectric stage 218 as the XYZ stage of a near-field microscope, similar to the case of using it as the near-field spectrometer, the high precision drive of the probe and the stage can be performed, therefore, a result measured with higher precision can be obtained.

In the above structure, an example has been described in which the piezoelectric stage 218 is used in the near-field spectrometer, it can be used for other drive mechanism such as, for example, a micro-feed-forward mechanism of a probe using a piezoelectric device.

In the above structure, for convenience in explanation, the creep property in the Z-axis direction has been described but the structure can be applied to the creep property in drive axis direction, X-axis direction and Y-axis direction using other piezoelectric devices.

In the above structure, an example in which the result measured is corrected in terms of software but, in stead of this, the above correction can be applied to the correction on the drive controlling values to the piezoelectric devices.

Figure 13:
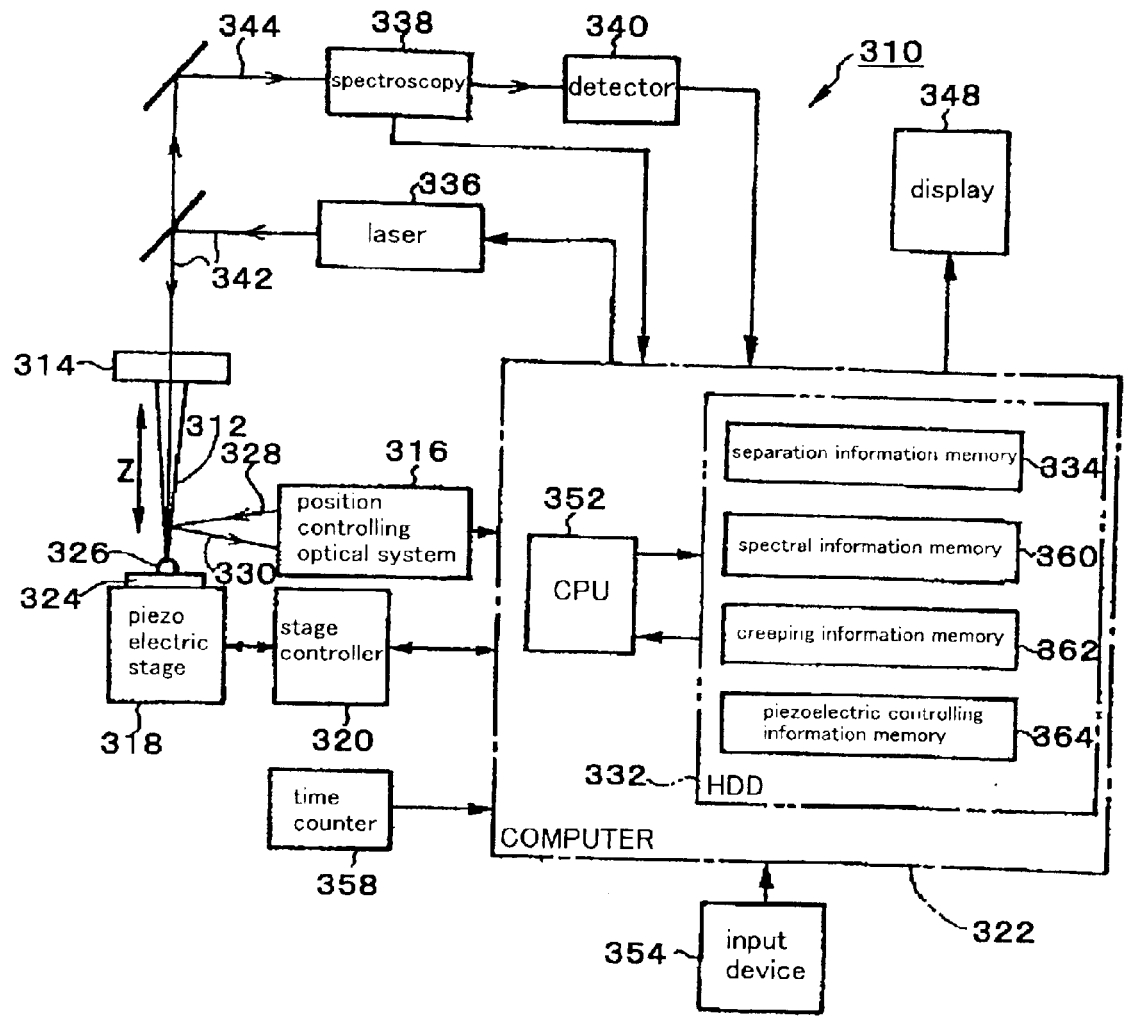
FIG. 13 shows an example of variants of the creep correction mechanism in the near-field spectrometer shown in FIG. 10.

In FIG. 13, an example of a modification of the near-field spectrometer using the piezoelectric stage is shown. As to the items corresponding to the ones in FIG. 10 above, a numeral 100 is added to indicate accordingly and the description is omitted.

A near-field spectrometer 310 shown in FIG. 13 comprises a piezoelectric stage 318, a stage controller 320, a creeping property memory 362 and a piezoelectric controlling information memory 364.

The creeping property memory 362 stores the creeping property of the piezoelectric stage 318 obtained as described above.

The piezoelectric controlling information memory 364 stores an electric signal complementary to the creeping property stored in the creeping property memory 362 as an electric signal to apply to drive the XYZ piezoelectric stage 318 by the stage controller 320.

Then, a signal ordering the start of the measurement is input, the stage controller 320 applies to the piezoelectric stage 318 the electric signal stored in the piezoelectric controlling information memory 364 that is complementary to the creep property synchronizing the timing information on the creeping property and drives the piezoelectric stage 318 in the direction of the drive axis.

As a result, the near-field spectrometer 310 shown in FIG. 13, similar to the near-field spectrometer shown in FIG. 10 above, has succeeded in formulating the creeping property and performs the creep correction based on its theoretical curve. That is, in the embodiment, since the piezoelectric stage is driven by applying to the piezoelectric stage the electric signal complementary to the creeping property, the impact of the creeping can be corrected and an accurate positioning is performed. In addition, because, similar to the near-field spectrometer shown in FIG. 10 above, the near-field spectrometer 310 shown in FIG. 13 corrects in terms of software using the theoretical curve, the structure is simple.

As described above, the near-field spectrometer, of course, can drive the probe and/or the stage with higher precision by employing a positioning device as described above as the stage of a near-field spectrometer such as a near-field microscope, comparing to the one in which an ordinary positioning device is used. Therefore, the result measured with higher precision can be obtained.

The one which can be listed as a positioning device used according to the invention comprises, for example, a creeping property memory storing a creeping property that has been formulated after the creeping in the direction of the drive axis of a piezoelectric stage has been measured and a stage controller that applies a electric signal complementary to the creeping property and drives the piezoelectric stage. By employing such a positioning device, the drive of the piezoelectric stage is controlled based on the theoretical curve of the creeping property. Thus, the impact of the drift can be corrected accurately in a simple structure.

The one which can be listed as a positioning device used according to the invention comprises, a creeping property memory storing a creeping property that has been formulated after the creeping in the direction of the drive axis of a piezoelectric stage has been measured, a measuring device that obtains the position information in the direction of the drive axis of the piezoelectric stage from the portions to be measured of the sample on the piezoelectric stage and a correction device that corrects in terms of software the result measured obtained by the measuring device according to the creeping property in the creeping property memory for the drive axis direction of the piezoelectric stage and obtains the result measured without the impact of the creeping. By using such positioning device, the entire result measured is corrected based on the theoretical curve. Therefore, the impact of the drift is corrected accurately with the simple structure.

It also comprises a constant determiner that, after one surface image has been obtained for every one portion to be measured by the measuring device, selects properly a plurality of points on the obtained image and calculates the values in the expression of the creeping property. Then, the constant determiner corrects with the values obtained by the constant determiner in terms of software the data of the portion to be measured obtained by the measuring device according to the creeping property in which the constants in the expression in the creeping property are substituted by the corresponding values obtained by the constant determiner and obtains the result measured after the impact of the creeping has been removed. By displaying the result measured after correction for each of portion to be measured, the result of the correction can be displayed one by one, for example, every time the measurement of each of portion to be measured has been finished.

<Method for Improving Positional Precision of Piezoelectric Stage

It is more preferable to employ a method for improving the positional precision described below when the piezoelectric stage is used as a positioning device.

The piezoelectric stage has problems of the absolute precision and repeatability because, for example, it can not keep the same position after a plurality of round trip within the same drive range and it can not keep the same position even though it is attempted to keep it at the same position due to its hysteresis and creeping.

Especially for the probe microscope, the impact of these problems are significant because the stage is driven within a extremely small range in nano-scale.

As the method for solving these problems, there is a method in which a position sensor of necessary precision is provided but this method has a problem that, for example, the apparatus becomes larger and that the response becomes slower for more time is required for measuring the position.

When using a piezoelectric stage as a positioning device, it is also important to improve the positional precision and, for this, it is very important to improve, especially, the hysteresis and the creeping.

Thus, in the embodiment, it is also preferable to employ a method described below for improving the positional precision of the piezoelectric stage.

The method for improving the positional precision of the piezoelectric stage is that the driving range of the piezoelectric stage is designated and repetitive drive within the drive range are performed in advance before the practical use.

Also in the above method, it is preferable to perform the repetitive drive by applying repeatedly the maximum and the minimum of the voltage to be applied corresponding to the drive range.

Also in the above method, it is preferable that a drive range is designated by the XY-axis, drive is performed repeatedly in the X-axis direction within the drive range on the X-axis from the starting point of the designated XY drive range and is performed repeatedly in the Y-axis direction within the drive range on the Y-axis from the starting point.

Also in the above method, it is also preferable that a drive range is designated by the XY-axis and drive is performed repeatedly in a comb-like pattern to cover the entire drive range in the XY-direction from the starting point of the designated drive range in the XY direction.

Now, the method for improving the positional precision of this piezoelectric stage will be described.

Figure 14:
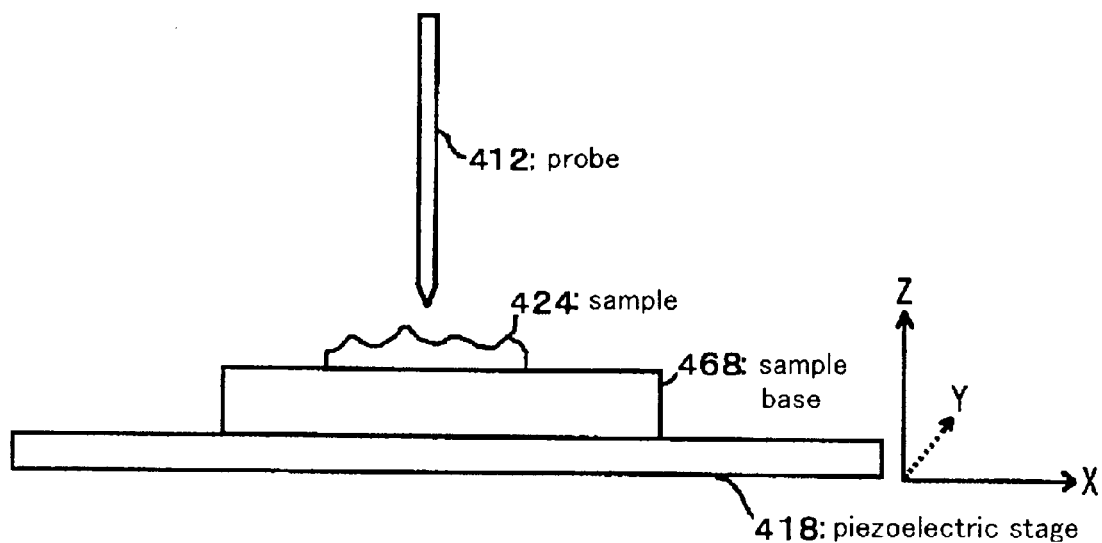
FIG. 14 shows a schematic view of the sample measuring section of the near-field spectrometer preferable in the embodiment.

In FIG. 14, a schematic view of the sample measurement portion of the near-field optical microscope described above is shown. In FIG. 14, a probe 412 is secured at a fixed position. On the other hand, a piezoelectric stage 418 mounted with a sample base 468 on it can be driven in the XYZ directions by a voltage applied ordered from the stage controller (not shown).

In order to always maintain the distance between the surface of the sample 424 placed on the sample base 468 and the tip of the probe 412 while the sample surface is being scanned in the XY directions, a feedback control is performed to the piezoelectric stage 418 in the Z-axis such that, in response to the topography of the sample, as described above, the scattered light intensity of a evanescent wave is constant.

Then, the topography information is obtained from the historical information on the move of the stage in the Z-axis direction while scanning on the sample surface.

Figure 15:
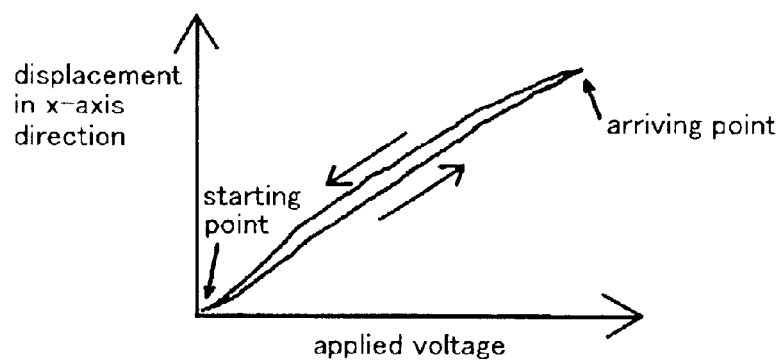
FIG. 15 is a graph showing the hysteresis property of a piezoelectric stage.

However, the piezoelectric stage has a hysteresis property and, for example, the voltage applied-displacement curve obtained when the stage is driven from the starting point to the arriving point of a predetermined drive range along the X-axis and is continuously driven from there to return to the starting point results in a discrepancy in the displacement for a same voltage applied as shown in FIG. 15.

Figure 16:
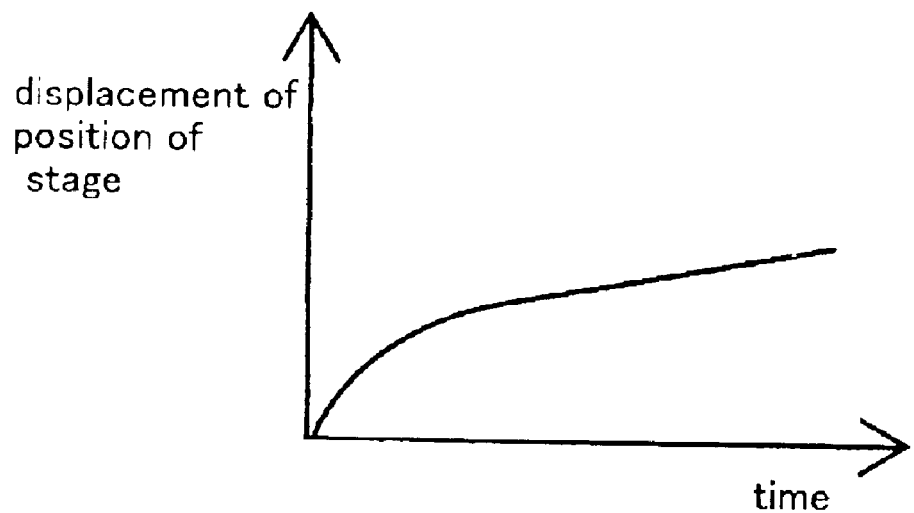
FIG. 16 is a graph showing the creep property of the piezoelectric stage.

Furthermore, the piezoelectric stage has a creeping property and, for example, a displacement occurs with time from the position it was placed before as shown in FIG. 16 even while an order to stop the drive of piezoelectric stage is being issued from the stage controller.

Therefore, the positional precision of the piezoelectric stage and, as a result, the accuracy of the topography information on the sample surface are limited because of these phenomena. For example, for probe microscopes, the limitation of the positional precision due to these factors are serious practical problems.

In order solve these problems, as a result of a intensive consideration, the inventors found that the hysteresis and the creeping of the stage during measurements can be significantly reduced by driving repeatedly the stage within the designated drive range before the measurements actually performed.

Figure 17:
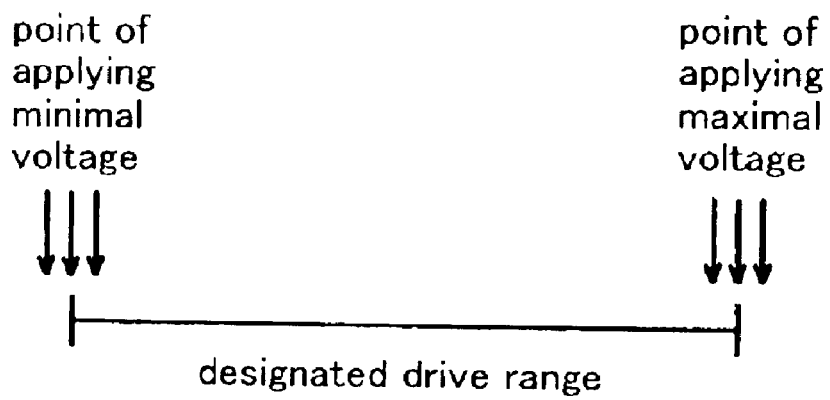
FIG. 17 illustrates an embodiment of the method improving the positioning precision of a piezoelectric stage preferable in the embodiment.

That is, for example, as shown in FIG. 17, the position of the piezoelectric stage is made stable and the positional precision is significantly improved by applying repeatedly the maximal voltage and the minimal voltage to be applied within the designated drive range. An apparent effect can be recognized, depending on the case, at around five times of the repetition and more improvement of the positional precision is recognized as the number of the repetition increases.

Therefore, for example, after designating the drive range of the stage, the stage is driven repeatedly within the drive range by the order of an operator or automatically and, then, a measurement is started. Since ten times, for example, of repeating drives do not need a long time, a significant improvement of the positional precision is achieved with a simple operation and without any large equipment.

It is necessary to re-perform the operation described above when the settings for the drive range have been changed. However, once performed before a measurement, the measurement can be continued with the improved positional precision as far as the settings of the drive range are not changed.

The methods described below can be employed as the repeated drive for improving the positional precision when the drive range of the stage is designated by the XY-axes.

Figure 18:
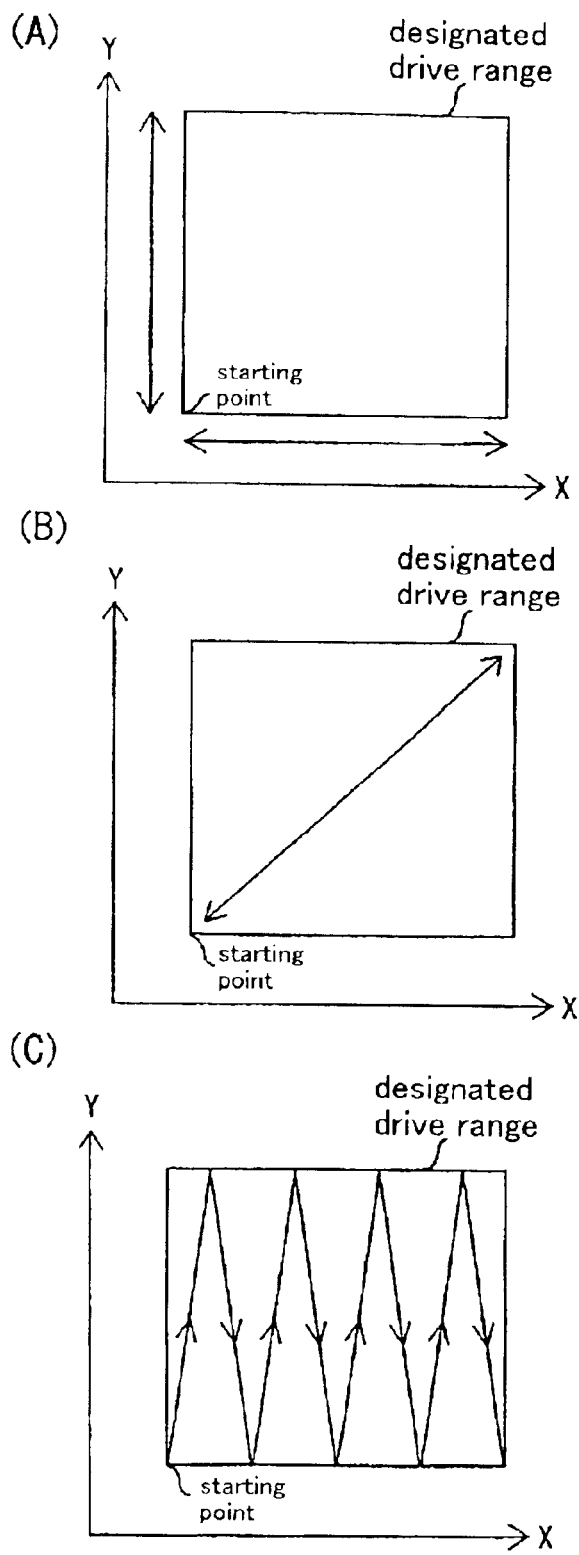
FIG. 18 illustrates an embodiment of the method improving the positioning precision of a piezoelectric stage preferable in the embodiment.

In the first method, as shown in FIG. 18(A), after the drive range has been designated first, the stage is driven to the starting point of the XY drive range and, then, it is driven repeatedly in the drive range of X-axis in the direction of X-axis. And the stage is driven to the starting point and, then, it is driven repeatedly in the drive range of Y-axis in the direction of Y-axis. As a result, the positional precision in both of the X-axis and Y-axis during use becomes stable.

In the second method, as shown in FIG. 18(B), after the drive range has been designated first, the stage is driven to the starting point of the XY drive range and, then, it is driven repeatedly to the arriving point of the drive range on the diagonal of the surface constituted by the XY drive range.

In the third method, as shown in FIG. 18(C), after the drive range has been designated first, the stage is driven to the starting point of the XY drive range and, then, it is driven repeatedly in a comb-like pattern covering the entire XY drive range.

The methods for improving the positional precision of the piezoelectric stage according to the invention have been described and it is also preferable to use a locking device described below.

<Sample Locking Device to Stage>

In probe microscopes such as, for example, the near-field optical microscope described above, that are required a nano-level positional precision, the methods such as the method in which a sample is stopped using the mechanical friction, the method in which a sample is stuck using a piece of double-faced adhesive tape and the method in which it is adsorbed using grease etc. are known as the methods for fixing a sample on a stage such as the piezoelectric stage.

However, the method in which a sample is stopped using the mechanical friction is effective only to stages and samples with large friction coefficients and other combinations of the stage and sample makes the sample slip. In addition, the position is also displaced when an inertial force is applied to the sample by an abrupt move of the stage.

On the other hand, in the method in which a piece of double-faced adhesive tape or grease is used, the adhesive or grease adheres to the sample and the sample is contaminated. In addition, since the double-faced adhesive tape and grease exhaust, it is necessary to supply them for each of measurement.

Then, a sample locking stage characterized in that the stage uses a gel-type absorbent, as a sample locking stage aiming at providing a sample locking device that locks a sample securely on the stage and does not contaminate the sample while it locks the sample will be described below.

Figure 19:
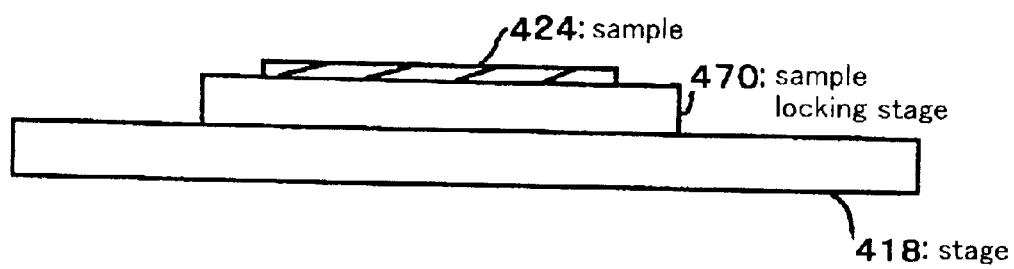
FIG. 19 illustrates an aspect of use of a sample fixing stage using a gel-type adsorbent.

In FIG. 19, an aspect of use of a sample locking stage using a gel-type adsorbent is shown. As shown in FIG. 19, a sample locking stage 470 comprising a gel-type adsorbent is mounted on a stage 418 such as the piezoelectric stage. A sample 424 is placed and locked on this locking stage 470.

The gel-type adsorbent is excellent in adsorptivity and, since the bonded portions of the sample and the gel are closely adhered, the sample is locked sufficiently.

In addition, since the gel does not substantially stick to the sample, the sample is not contaminated and it can be easily detached.

As a gel-type adsorbent, a mat and a solid which increase the friction coefficient are exemplified and, more specifically, silicone gel, silicone rubber and other gels made of bridge structure of organic high-polymers can be listed.

Figure 20:
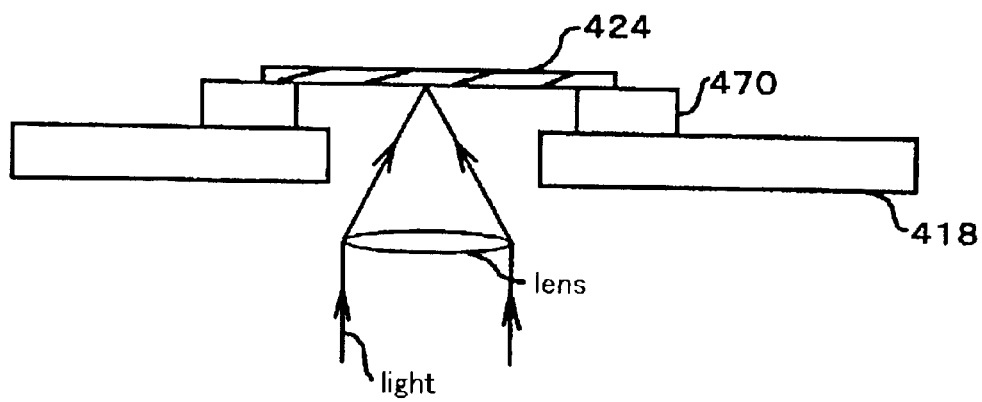
FIG. 20 illustrates an aspect of use of a sample fixing stage using a gel-type adsorbent.

When a transparent gel-type adsorbent is used, visual observation or microscope observation from the bottom side of the sample is possible. Otherwise, as shown in FIG. 20, visual observation or microscope observation from the bottom side of the sample is also possible by applying the gel-type adsorbent only on the edge portion of the sample.

By connecting electrically the locking stage and the sample using a conductive gel-type adsorbent, the stage can also be applied to STM etc. As such a conductive gel-type adsorbent, highly conductive plastic sheet comprising a metal component dispersed at a high density (for example, the one with the order of the sheet's volume specific resistance value of $10^{-3}$–$10^{-4}$ $\Omega \cdot cm$) in a resin (such as polyolefins, polyesters or fluororesins) is exemplified.

Using the sample locking stage described above, the effects that the sample is not contaminated, is securely locked on the stage and is easily detached from the stage are achieved.

As described above, according to the above-described method for improving the positional precision of the stage, repeated drive of the stage within the designated drive range is performed in advance before the actual use. As a result, the above-described method for improving the positional precision of the stage significantly reduces the hysteresis and creeping of the stage. Thus, the above-described method for improving the positional precision of the stage improves the positional precision of the stage without any large device and without much time for positioning.

Also in the embodiment, it is preferable to add a continuous measurement mechanism described below.

Continuous Measurement Mechanism

In the analyzers having a nano-level resolution such as the ones represented by a probe microscope, the mechanical drift of the unit and the drift of the laser intensity can not avoid completely as a practical problem, Then, it is commonly practiced measuring images with limited drift by securing a faster scanning speed than the amount of the drift. However, in the near-field spectral analysis, since the measurement of the spectra essentially needs much time, the scanning speed can not be increased. Thus, the impact of the drift is strong when measuring data over a wide range.

Figure 21:
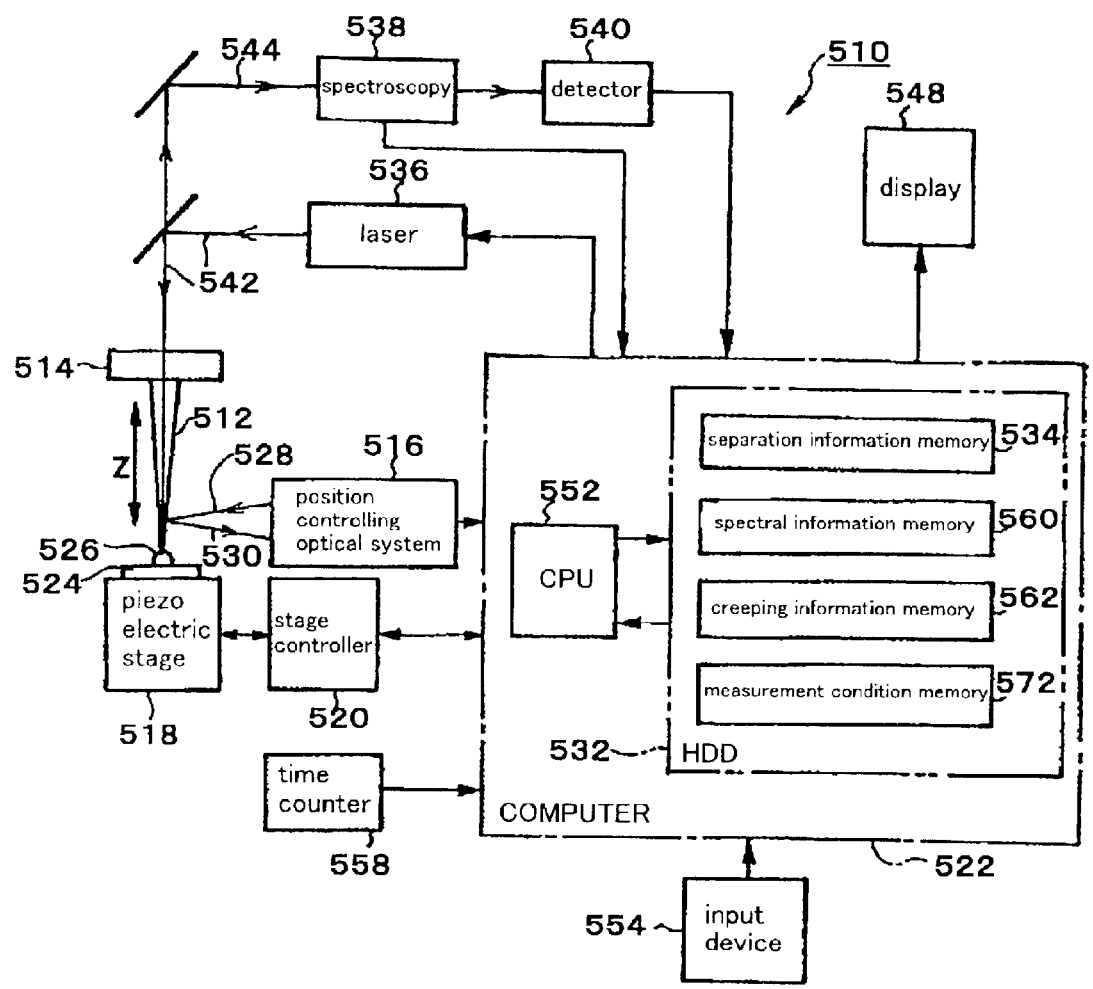
FIG. 21 illustrates a continuous measuring mechanism suitable for use in the near-field spectrometer shown in FIG. 10.

Then, as shown in FIG. 21, it is also preferable to use a near-field spectrometer that measures the topography and spectrum of the sample surface and time decomposition data. As to the items corresponding to the ones in FIG. 10 above, a numeral 300 is added to indicate accordingly and the description is omitted.

A near-field spectrometer 510 shown in FIG. 21 comprises a input device 554 and a measurement condition memory 572.

The input device 554 inputs a plurality of mapping measurement conditions in advance to a computer 522. As the mapping measurement conditions, for example, the area to be measured, feedback conditions, spectral measurement conditions etc. are input.

The measurement condition memory 572 stores the mapping measurement conditions input from the input device 554 such as, for example, the area to be measured.

When a signal ordering the start of a measurement is input to the computer 522, a CPU 552 accesses mapping measurement condition information in the measurement condition memory 572 and, according to the mapping measurement condition information, controls the operation of each of instrument of the near-field spectrometer 510 including, for example, a stage 518 and a stage controller 520 etc. Therefore, the measurement is conducted automatically.

Figure 22:
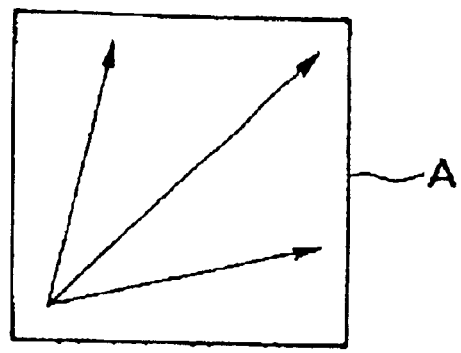
FIG. 22 shows an example of the setting of a common measuring range.

Here, in the conventional mapping measurement, it is common that one large area to be measured A as shown in FIG. 22 is set and the large area to be measured A is map-measured at one time.

Figure 23:
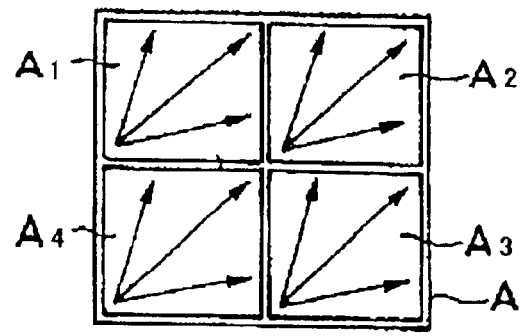
FIG. 23 shows an example of the setting of the measuring range suitable for use in the continuous measuring mechanism shown in FIG. 21.

However, in the embodiment, as to setting areas to be measured, as shown in FIG. 23, for example, a large area to be measured A is divided into, for example, four areas $A_1$, $A_2$, $A_3$ and $A_4$, and each of them is measured individually.

Here, a margin is provided in each of the images to be measured in the portion adjacent to the next image and it is preferable to connect each of the results measured through the margins after a measurement.

Figure 24:
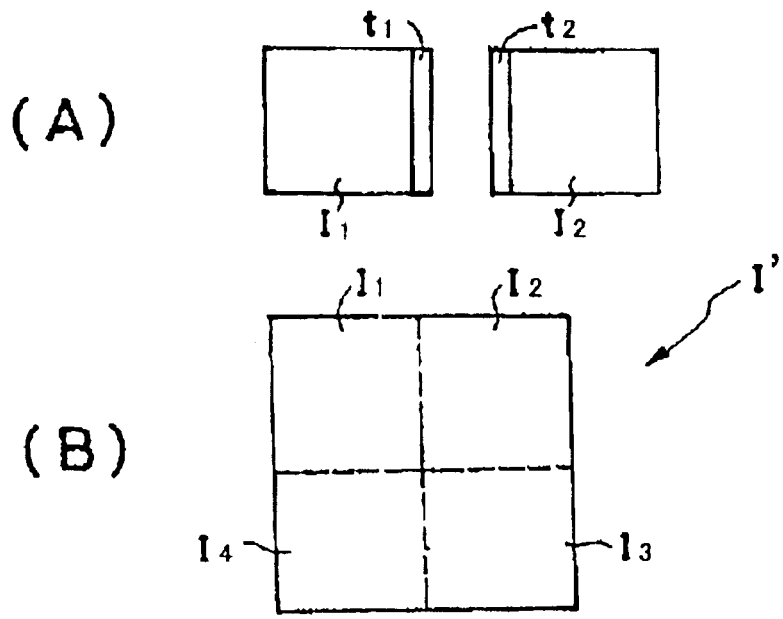
FIG. 24 illustrates a method for combining the divided images obtained by the continuous measuring mechanism shown in FIG. 21.

In the embodiment, for example, as shown in FIG. 24(A), a margin $t_1$ is provided in an image $I_1$ obtained from the area $A_1$ and a margin $t_2$ is provided in an image $I_2$ obtained from the area $A_2$ for connecting the image $I_1$ obtained from the area $A_1$ and the image $I_2$ obtained from the area $A_2$. Therefore, the image $I_1$ obtained from the area $A_1$ and the image $I_2$ obtained from the area $A_2$ can be connected through the margins $t_1$ and $t_2$.

Utilizing a combination as above, by connecting the image $I_1$ obtained from the area $A_1$, the image $I_2$ obtained from the area $A_2$, the image $I_3$ obtained from the area $A_3$ and the image $I_4$ obtained from the area $A_4$, one image I' can be finally obtained and the measurement result for the large area to be measured A can be obtained.

In this way, in the embodiment, a large area to be measured is divided into a plurality of areas and they are measured respectively. As a result, in the embodiment, the time necessary for one measurement can be made short and the impact of the drift etc. can be reduced. Thus, in the embodiment, the impact of the drift to the entire measurement result can be significantly reduced.

When connecting the images measured, a two-dimensional correlation coefficient of the portions where two images are overlapped is obtained by a CPU. Here, it is also preferable in terms of simplification of operation, that the arrangement of the images is obtained such that the coefficient is as close to one as possible and the images are positioned automatically.

In this embodiment, it is also preferable to add an independent designation mechanism having a measurement range described below.

Measurement Range Independent Designation Mechanism

In a near-field spectrometer, the mapping measurement of the topography of a sample and the mapping measurement of the spectrum are conducted at the same time.

In the above spectrometer, generally, the same point is selected as the point where the topography of the sample is measured and the point where the spectrum is measured. However, since a spectrum mapping usually needs a very long time, a same area needs to be measured again only for the topography when a more precise topography needs to be obtained.

Since two measurements need to be conducted in above procedure, the procedure is complicated and the area measured twice is not always truly same due to the drift of the stage.

Figure 25:
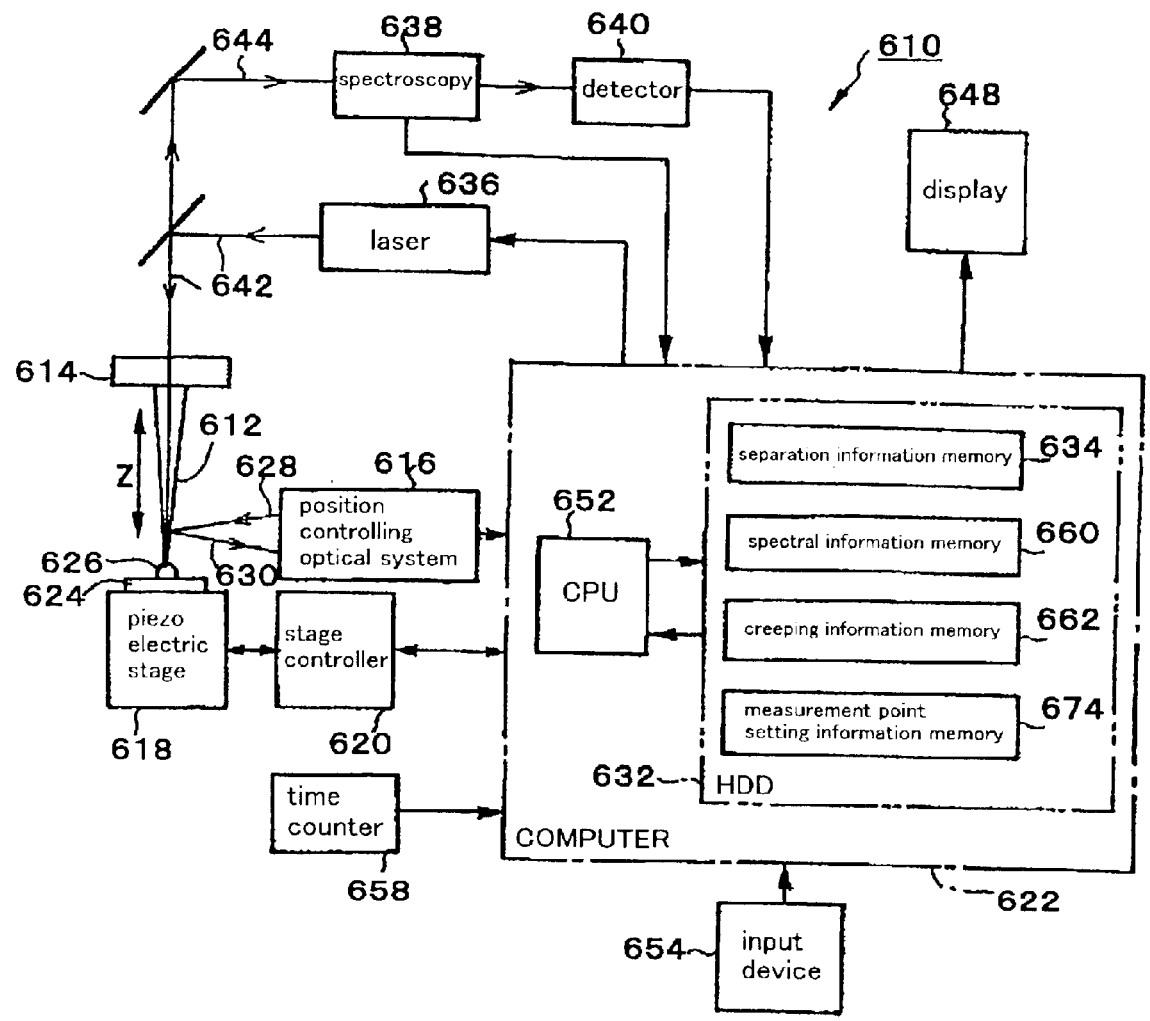
FIG. 25 illustrates a measuring range independent designation mechanism suitable for use in the near-field spectrometer shown in FIG. 10.

Then, it is preferable to use a near-field spectrometer as shown in FIG. 25 that measures the topography of a sample surface, the optical spectrum of the sample surface and time decomposition data. As to the items corresponding to the ones in FIG. 13 above, a numeral 300 is added to indicate accordingly and the description is omitted.

The near-field spectrometer 610 shown in FIG. 25 comprises an input device 654 and measurement point setting information memory 674.

The input device 654 sets separately the mapping measurement points for measuring the topography of the surface and the mapping measurement points for the optical spectrum.

The measurement point information memory 674 stores separately the mapping measurement points for the surface topography measurement and mapping measurement points for the optical spectrum input from the input device 654.

When a signal ordering the start of the measurement is input into a computer 622, CPU 652 accesses the measurement points setting information in the measurement point information memory 674 and, according to its measurement point setting information, controls the operations of each of device in the near-field spectrometer 610 including, for example, a stage 618, a stage controller 620.

Figure 26:
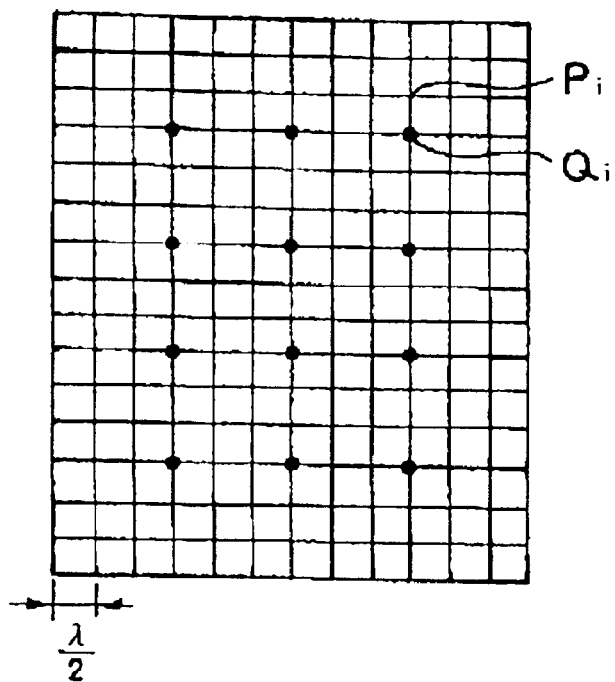
FIG. 26 shows an example of a measuring range independent designation created by the measuring range independent designation mechanism shown in FIG. 25; and, FIG. 27 shows an example of a measuring range independent designation created by the measuring range independent designation mechanism shown in FIG. 25.

For example, the CPU 652 orders to the stage controller 620 the contents for controlling the stage 618 such that the tip of a probe 612 measures the surface topography when it is positioned at each of mapping measurement point $P_1$ of a sample 624 indicated by an intersection of the lattice as shown in FIG. 26 (the interval of measurements is, for example, the light wavelength $\lambda$ or less, for example, $\lambda/2$), and it map-measures an optical spectrum when it is positioned at a mapping measurement point $Q_1$ for each of optical spectrum indicated by a dot on the lattice.

Here, in the embodiment, it is preferable, in terms of reducing the time necessary for the measurement, that the number of the points to be measured for the optical spectrum $Q_1$ of the sample 624 is fewer than the number of the points to be measured for the surface topography.

As a result, in the near-field spectrometer 610 shown in FIG. 25, the mapping measurements of the surface topography and the optical spectrum can be conducted at precision suitable for each of the resolution of the surface topography and the resolution of the optical spectrum at one time. In addition, since the number of the points to be measured for the optical spectrum $Q_1$ is fewer than the number of the points to be measured for the surface topography $P_1$, the time necessary for measurement can be significantly reduced.

Figure 27:
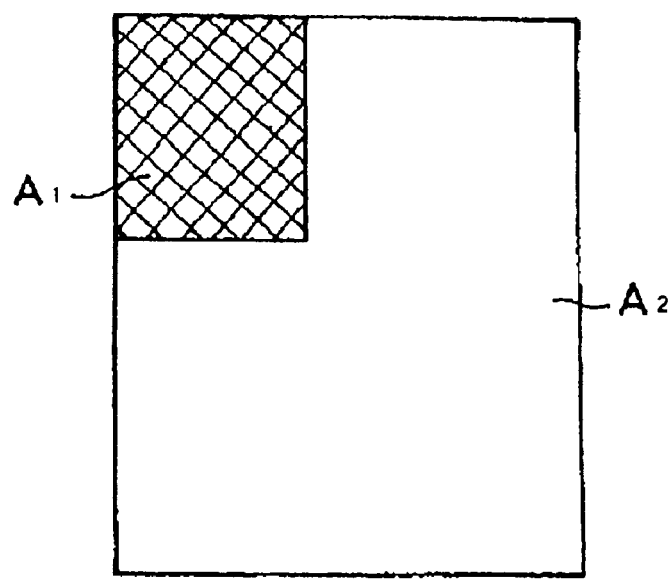

Furthermore, instead of setting the points to be measured for the optical spectrum $Q_1$ at a same interval on the surface to be measured as shown in FIG. 26, as shown in FIG. 27, for example, setting an area to be measured for the optical spectrum $A_1$ in a small area on the surface to be measured and setting an area to be measured for the surface topography $A_2$ in a large area except for the area $A_1$ is also preferable since the same effect as in the case of setting the points to be measured as shown in above FIG. 26 can be obtained from this procedure.

What is claimed:

1. A near-field spectrometer comprising:
a near-field information collector for collecting scattered near-field light by bringing a sample and a tip of a probe into proximity inside a near-field region, analyzing spectrally the collected scattered light and obtaining near-field spectral information on the sample;
a background information collector for obtaining the background spectral information under the condition where the sample and the tip of the probe are spaced apart from each other by a predetermined distance outside the near-field region;
a Z-axis scanner scanning in the Z-axis direction spacing the sample and the tip of the probe apart from each other or bringing them into proximity, the Z-axis scanner bringing the sample and the tip of the probe into proximity at a predetermined distance inside the near-field region when the near-field information collector obtains the near-field spectral information, the Z-axis scanner spacing the sample and the tip of the probe apart from each other at a predetermined distance outside the near-field region when the back ground spectral information collector obtains the back ground spectral information; and
a data processor for obtaining true near-field spectral information free from the background by subtracting the background spectral information obtained by the background information collector from the near-field spectral information obtained by the near-field information collector; wherein
the background information collector, during the spacing of the sample and the tip of the probe apart in the Z-axis direction at a predetermined distance outside the near-field region by the Z-axis scanner, obtains the background spectral information on a corresponding portion to be measured.

2. The near-field spectrometer according to claim 1, wherein a plurality of surfaces to be measured are set as the portion to be measured on the surface to be measured of the sample, the near-field spectrometer further comprising an XY-axis scanner scanning the tip of the probe above the surface to be measured of the sample in the X-axis and Y-axis direction orthogonal to the Z-axis, the near-field information collector scanning the tip of the probe above the surface to be measured in the X-axis direction and in the Y-axis direction and obtaining the near-field spectral information for the surface to be measured under the condition in which the sample and the tip of the probe are brought close to each other at a predetermined distance within a near-field region by the Z-axis scanner, the background information collector obtaining the background spectral information for the surface to be measured at the starting point and/or the arriving point of the move of the tip of the probe during the separation at a predetermined distance outside the near-field region when the sample and the tip of the probe are separated from each other in the Z-axis direction by the Z-axis scanner while the move of the probe to the next surface, the data processor obtaining the true near-field spectral information free from the each of the background for each of the corresponding surface to be measured by subtracting each of the background spectral information for each of the surface to be measured from each of the corresponding near-field spectral information.

3. The near-field spectrometer according to claim 1, wherein a plurality of lines to be measured are set as the portion to be measured on the surface to be measured of the sample in the direction of one axis in a X-axis and Y-axis plain, the near-field spectrometer further comprising an XY-axis scanner for scanning the tip of the probe above the surface to be measured of the sample in the X-axis and Y-axis direction orthogonal to the Z-axis, the near-field information collector obtaining the near-field spectral information one by one from each of the lines to be measured, the background information collector obtaining the background spectral information for the line to be measured of the starting point and/or arriving point of the move of the tip of the probe during the separation at a predetermined distance outside the near-field region when the sample and the tip of the probe are separated in the Z-axis direction by the Z-axis scanner while the tip of the probe is being moved to the next line to be measured, the data processor obtaining the true near-field spectral information free from each of the corresponding background for each of the line to be measured by subtracting the background spectral information for each of the line to be measured from each of the corresponding near-field spectral information.

4. The near-field spectrometer according to claim 1, wherein a plurality of points to be measured are set as the portion to be measured on the surface to be measured of the sample, the near-field spectrometer further comprising an XY-axis scanner for scanning the tip of the probe above the surface to be measured of the sample in the X-axis and Y-axis direction orthogonal to the Z-axis, the near-field information collector obtaining the near-field spectral information one by one from each of the points to be measured, the background information collector obtaining the background spectral information for the point to be measured of the starting point and/or the arriving point of the move of the tip of the probe during the separation at a predetermined distance outside the near-field region when the sample and the tip of the probe are separated in the Z-axis direction by the Z-axis scanner while the tip of the probe is being moved to the next point to be measured, the data processor obtaining the true near-field spectral information free from each of the corresponding background for each of the point to be measured by subtracting the background spectral information for each of the point to be measured from each of the corresponding near-field spectral information.

5. The near-field spectrometer according to claim 1, further comprising:

a light-distance characteristic collector for obtaining a relation between light and distance by obtaining spectral information on the sample while changing the distance of separation between the surface to be measured of the sample and the tip of the probe by the Z-axis scanner; and a selector for selecting the distance with which a desired light characteristic is obtained, from the relation between light and distance obtained by the light-distance characteristic collector; wherein when obtaining the background spectral information by the background information collector, the distance selected by the selector is the distance of separation in the Z-axis direction between the surface to be measured of the sample and the tip of the probe separated by the Z-axis scanner.

6. The near-field spectrometer according to claim 1, wherein the Z-axis scanner is a moving device scanning the probe and/or a moving stage mounting the sample and scanning the sample.

7. The near-field spectrometer according to claim 2, wherein the XY-axis scanner is a moving device scanning the probe and/or a moving stage mounting the sample and scanning the sample.

8. The near-field spectrometer according to claim 3, wherein the XY-axis scanner is a moving device scanning the probe and/or a moving stage mounting the sample and scanning the sample.

9. The near-field spectrometer according to claim 4, wherein the XY-axis scanner is a moving device scanning the probe and/or a moving stage mounting the sample and scanning the sample.

10. The near-field spectrometer according to claim 1, wherein the near-field information collector at least includes a light source, an optical fiber probe as the probe, a spectroscopy spectrally analyzing the light scattered by the probe and a detector obtaining the near-field spectral information from the light spectrally analyzed by the spectroscopy, and wherein the background information collector comprises at least the light source, the fiber probe, the spectroscopy analyzing the background light and the detector obtaining the background spectral information from the background light spectrally analyzed by the spectroscopy.

* * * * *